United States Patent [19]
Takatsuka et al.

[11] Patent Number: 5,437,317
[45] Date of Patent: Aug. 1, 1995

[54] VENTILATION LINE OPENING/CLOSING MEANS OF FUEL TANK

[75] Inventors: Seiichi Takatsuka; Yukihiro Tsugita; Kyokuichi Sato, all of Soja, Japan

[73] Assignee: Om Corporation, Okayama, Japan

[21] Appl. No.: 177,266

[22] Filed: Jan. 4, 1994

[30] Foreign Application Priority Data

Feb. 4, 1993 [JP] Japan .................. 5-017457

[51] Int. Cl.⁶ .................. B65B 1/04; B65B 3/04
[52] U.S. Cl. .................. 141/312; 141/301; 141/326; 220/86.2; 137/589
[58] Field of Search ........ 141/301, 307, 312, 325, 141/326, 44, 45, 46, 59, 302; 220/86.2, DIG. 33, 746, 749; 137/587, 588, 589

[56] References Cited

U.S. PATENT DOCUMENTS

| | | | |
|---|---|---|---|
| 4,625,777 | 12/1986 | Schmidt | 141/286 |
| 4,706,708 | 11/1987 | Fornuto et al. | 137/588 |
| 4,742,809 | 5/1988 | Ito et al. | 220/746 |
| 4,932,444 | 6/1990 | Micek | 141/302 |
| 4,955,950 | 9/1990 | Seiichi et al. | 137/587 |
| 5,056,570 | 10/1991 | Harris et al. | 141/302 |
| 5,186,220 | 2/1993 | Scharrer | 137/589 |
| 5,215,132 | 6/1993 | Kobayashi | 137/587 |
| 5,263,511 | 11/1993 | Ohasi et al. | 141/59 |

*Primary Examiner*—J. Casimer Jacyna
*Assistant Examiner*—Steven O. Douglas
*Attorney, Agent, or Firm*—Koda and Androlia

[57] ABSTRACT

A ventilation line opening/closing device for a fuel tank wherein opening/closing valve is provided in a ventilation line for vapor leading from the fuel tank to a canister. The opening/closing valve includes a closure device for closing the valve by opening a shutter when a fuel supplying nozzle is inserted into a filler port. The valve remains closed even when the fuel supplying nozzle is removed from the filler port and is only opened by an opening device for opening the valve when the filler cap is tightly fitted into the filler port.

5 Claims, 21 Drawing Sheets

VENTILATION LINE OPENING/CLOSING MEANS OF FUEL TANK

BACKGROUND OF THE INVENTION

1. Industrial Field of the Invention

The present invention relates to a ventilation line opening/closing means of a fuel tank which interrupts a ventilation line extending from the fuel tank to a canister only during fuel supply and opens the ventilation line except for during the fuel supply, so as to limit a fuel level when the fuel tank is full (to prevent overfilling of the fuel).

2. Description of the Prior Art

It has conventionally been performed to prevent over-supplying of fuel into a fuel tank under such a condition that a pressure in the closed fuel tank is increased. In recent years, since air pollution control regulations have been practically enforced, it becomes necessary to perform such modification of design that, in order to effectively remove excessive fuel vapor and to prevent fuel from dispersing in the atmosphere due to an increase of a temperature in the fuel tank, there is provided a ventilation line communicating the fuel tank and a canister.

In a typical example of the fuel tank in which a modification of design demanded from the reinforcement of the air pollution control act is performed and which can restrict the overfilling of fuel, an opening/closing valve is provided in the ventilation line. The opening/closing valve ordinarily operates to open the ventilation line at the time of running of the automobile so as to discharge the fuel vapor to the canister and it operates to shut the ventilation line at the time of fuel supply for the purpose of realizing a closed condition of the fuel tank. A device including the above-described ventilation line is generally called as a ventilation line opening/closing means. Examples of such means have been disclosed in U.S. Pat. Nos. 4,625,777 and 4,706,708.

However, there have been pointed out various disadvantages of the conventional ventilation line opening/closing means.

More specifically, in the ventilation line opening/closing means disclosed in U.S. Pat. No. 4,625,777, a plunger rod for detecting that a filler cap is opened or closed interferes with a fuel supplying operation, or in some cases the plunger rod contacts with a fuel supplying nozzle to actuate the opening/closing valve by mistake. Also, in the means of U.S. Pat. No. 4,706,708, because the opening/closing valve is closed/opened every time the fuel supplying nozzle is inserted/extracted, the closing/opening of the ventilation line is sometimes repeated when the fuel supplying nozzle is inserted into or extracted out of the fuel port at the time of so-called additional fuel supply, so that the limitation of the fuel level raising cannot satisfactorily be performed when the fuel tank is full.

Further, the conventional ventilation line opening/closing means has a complicated structure, and it is difficult to attach the opening/closing valve to the opening/closing means or exchange the valve. An iron filler neck is difficult to be finishedly coated uniformly.

SUMMARY OF THE INVENTION

A ventilation line opening/closing means necessitates to satisfy the following three requirements: (1) optimum timing of operation of an opening/closing valve (the opening/closing valve does not operate in response to the above-mentioned additional fuel supply); (2) operation reliability of the opening/closing valve (the opening/closing valve does not interfere with insertion or extraction of a fuel supplying nozzle and the valve operation is synchronously carried out); and (3) simplification of the structure (productivity and maintenance facility are taken into account). In order to attain the above requirements, it has been developed a ventilation line opening/closing means of a fuel tank characterized in that an opening/closing valve disposed in a ventilation line extending from the fuel tank to a canister, is provided with a closure means for closing the valve when the fuel supplying nozzle is inserted in a filler port and an opening means for opening the valve when a filler cap is tightly fitted into the filler port. A filler neck leading to the fuel tank comprises upper and lower portions integrally connected to each other in the vicinity of the bottom of a cap retainer. The ventilation line opening/closing means is provided below the connecting portion of the upper and lower portions of the filler neck.

In the case where the opening/closing valve is a rotatable valve, the ventilation line opening/closing means can be constructed such that the rotatable valve plate having a projecting pin is connected via a coil spring to a slide plate having a pressing portion at the upper end, the projecting pin being inserted in a downwardly-curved arcuate cam groove with a stepped shoulder at the bottom, which cam groove is formed in an inwardly-extending member at a lower end of the slide plate, the rotatable valve plate is pivotally connected to a communication block in such a manner that it can slide in contact with a side wall of the communication block where a pair of ventilation line openings extending from the fuel tank and the canister exist, thereby constituting the opening/closing valve, and the opening/closing valve is adapted to be operated by: a closure means for the opening/closing valve which forces the slide plate upwardly until the pin of the rotatable valve plate engages with the stepped shoulder of the cam groove when it is pushed by a shutter downwardly rotated by the fuel supplying nozzle inserted into the filler port and which rotates the rotatable valve plate, thereby closing the ventilation line openings; and an opening means for the opening/closing valve which moves the slide plate downwardly again when the tightly fitted filler cap pushes the pressing portion of the slide plate, and which simultaneously returns the rotatable valve plate to its original position by releasing the pin from the engagement with the stepped shoulder to thereby communicate the ventilation line openings with each other.

Also, in the case where the opening/closing valve is a slide valve, the ventilation line opening/closing means may be constructed such that the slide valve including a pressing portion at the upper end and an engagement pin or pins at the intermediate portion is arranged to slide within a valve casing in which ventilation line openings from the fuel tank and the canister which are disposed on an inner side surface of the valve casing are communicated with each other, thus constituting the opening/closing valve, and the opening/closing valve is adapted to be operated by: a closure means for the opening/closing valve which forces the slide valve upwardly so as to interrupt the ventilation line when the engagement pin or pins are pushed by means of a hook or hooks provided on a shutter rotated downwardly by being pushed with the inserted fuel supplying nozzle or by means of a coil spring attached thereto; and an opening means for the opening/closing valve which moves the slide valve downwardly again so as to open the ventilation line when the tightly fitted filler cap pushes the pressing portion of the slide valve.

Further, in the case where the slide valve is utilized, the ventilation line opening/closing means may be constructed such that the slide valve includes a pressing portion at the upper end, engagement pins at the intermediate portion and an upwardly-expansible spring attached to the lower end, the slide valve being adapted to slide within a valve casing having elastic arms for engaging with the engagement pins, which valve casing communicates with ventilation line openings from the fuel tank and the canister provided on an inner side wall of the valve casing, thus constituting the opening/closing valve, and the opening/closing valve is adapted to be operated by: a closure means for the opening/closing valve which forces the slide valve upwardly by means of the spring so as to interrupt the ventilation line when hooks provided on a shutter downwardly rotated by the inserted fuel supplying nozzle bias the elastic arms to release the engagement pins; and an opening means for the opening/closing valve which moves the slide valve downwardly again so as to open the ventilation line when the tightly fitted filler cap pushes the pressing portion of the slide valve.

The ventilation line opening/closing means using the rotatable valve operates as follows. More specifically, the projecting pin formed on the rotatable valve plate normally prevents the coil spring from pushing the slide plate upwardly. When the shutter rotates to push the pin by the insertion of the fuel supplying nozzle, the restriction of the slide plate by the pin is weakened so that the slide plate moves upwardly. The pin itself slides in contact with the cam groove in a direction toward the slide plate.

When the pin is released from being pressed by the shutter, the pin slides in contact with the cam groove in a direction apart from the slide plate by an action of the coil spring so as to engage with the stepped shoulder. The rotatable valve plate maintains a closed condition of the ventilation line until the slide plate moves downwardly.

When the filler cap is tightly fitted in the filler neck, the pressing portion formed at the upper end of the slide plate is pushed by the filler cap so that the slide plate is moved downwardly. As a result, the stepped shoulder of the cam groove is displaced downwardly from the pin. The pin engaged with the stepped shoulder of the cam groove is released. Thus, the rotatable valve plate is rotated by the action of the coil spring so that it cannot maintain the closed condition of the ventilation line so as to open the ventilation line again.

In the opening/closing means using the slide valve, the engagement pin at the intermediate portion of the slide valve is pushed directly by the hook of the shutter or indirectly via the coil spring by the shutter, thereby moving the slide valve upwardly. The slide valve is kept stationary at the lifted position as long as the slide valve is not pressed downwardly. In contrast with this, in the case where the spring is provided at the lower end of the slide valve, when the elastic arms are disengaged from the engagement groove of the slide valve by the hook of the shutter, the spring expands to push the slide valve upwardly. The slide valve is stationary at the lifted position under such a condition that it is being urged upwardly by the spring and is maintained in this state until the spring is contracted.

When the filler cap is tightly fitted in the filler neck, the pressing portion at the upper end of the slide valve is pressed by the filler cap so that the slide valve moves downwardly. Thus, when the filler cap is completely fitted into the filler neck, the ventilation line is opened again. The slide valve is kept in this condition as long as the slide valve is not applied with motion from the exterior.

In the case where the spring is provided at the lower end of the slide valve, the slide valve is pressed downwardly by the screwing operation of the filler cap into the filler port and the spring at the lower end of the slide valve is contracted. In this case, because there exists an urging force of the spring, the slide valve returns to the lifted position when the filler cap is disconnected. When the filler cap is completely fitted in the filler neck, the elastic arms engage with the engagement pins and the slide valve is maintained at the lowered position while contracting the spring, thereby opening the ventilation line.

In this way, since the switching operation of the opening/closing valve from the opening state to the closing state is synchronously started when the shutter rotates by the insertion of the fuel supplying nozzle and it is opened when the filler cap is tightly fitted in the filler neck, the ventilation line can effectively be opened or closed. Therefore, by the ventilation line opening/closing means according to the present invention, it is possible to realize a fuel tank which can be restricted from being overfilled with fuel while satisfying the standard of the air pollution control act.

Also, since the ventilation line opening/closing means includes such a structure that this fuel supplying period is regarded to involve the inserting operation of the fuel supplying nozzle into the filler port and the fitting operation of the filler cap, even if the succeeding fuel supply is supplemented, the optimum timing of operation of the opening/closing valve can be established for restricting the fuel level of the fuel tank when it is full.

Further, because there is no projection attachment required for mounting the opening/closing valve, the opening/closing valve can surely be operated without any trouble, and the iron filler neck can readily be finishedly coated. Moreover, the ventilation line opening/closing means has a simplified structure so that it can easily be assembled and the opening/closing valve can readily be exchanged, which results in remarkable economy effects.

DETAILED DESCRIPTION OF THE INVENTION

Preferred embodiments of the invention will now be described with reference to the drawings.

Figure 1:
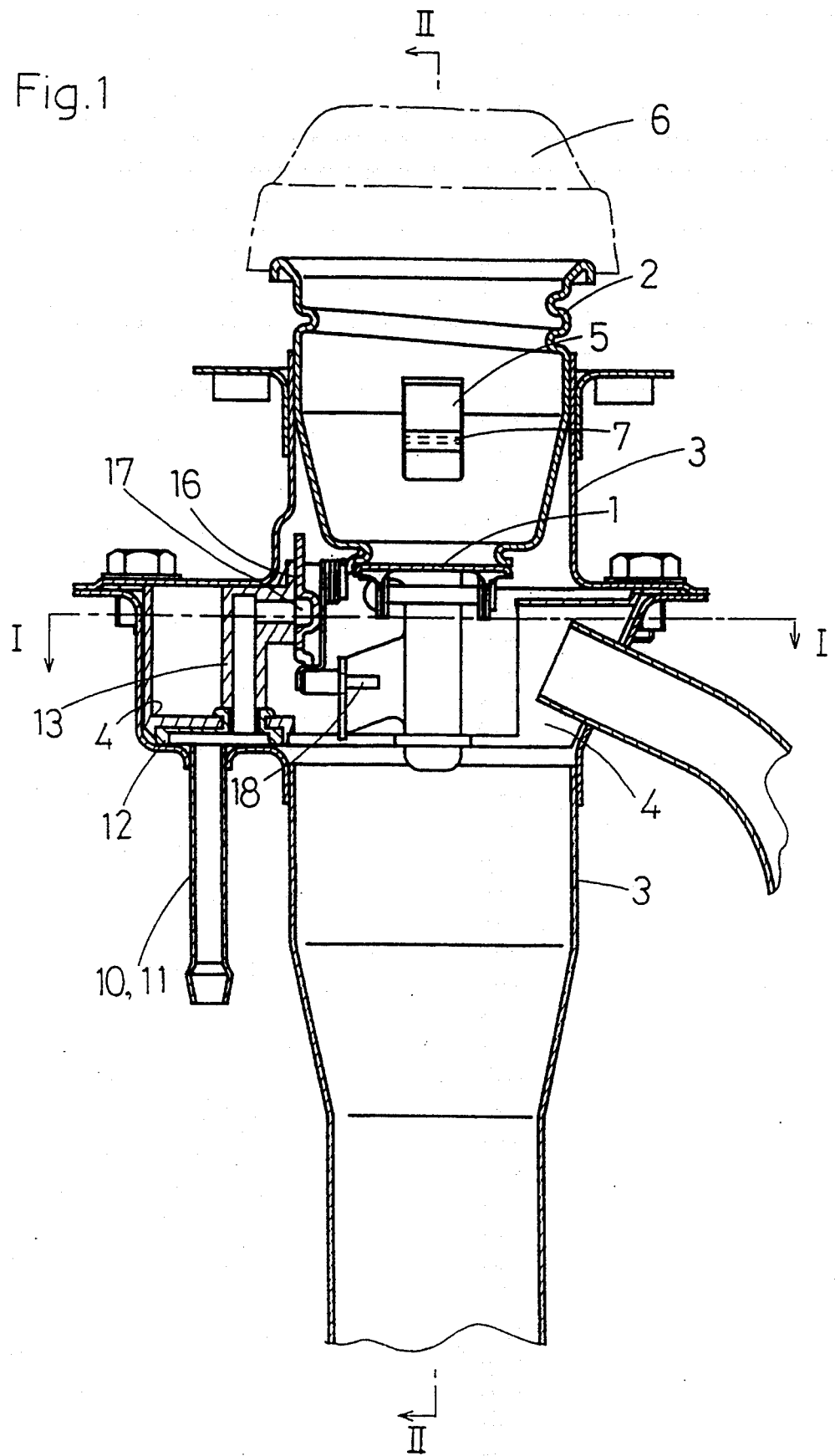
FIG. 1 is a cross-sectional view of a filler port and its surroundings, in which a ventilation line opening/closing means having an rotatable-type opening/closing valve is disposed.
Figure 2:
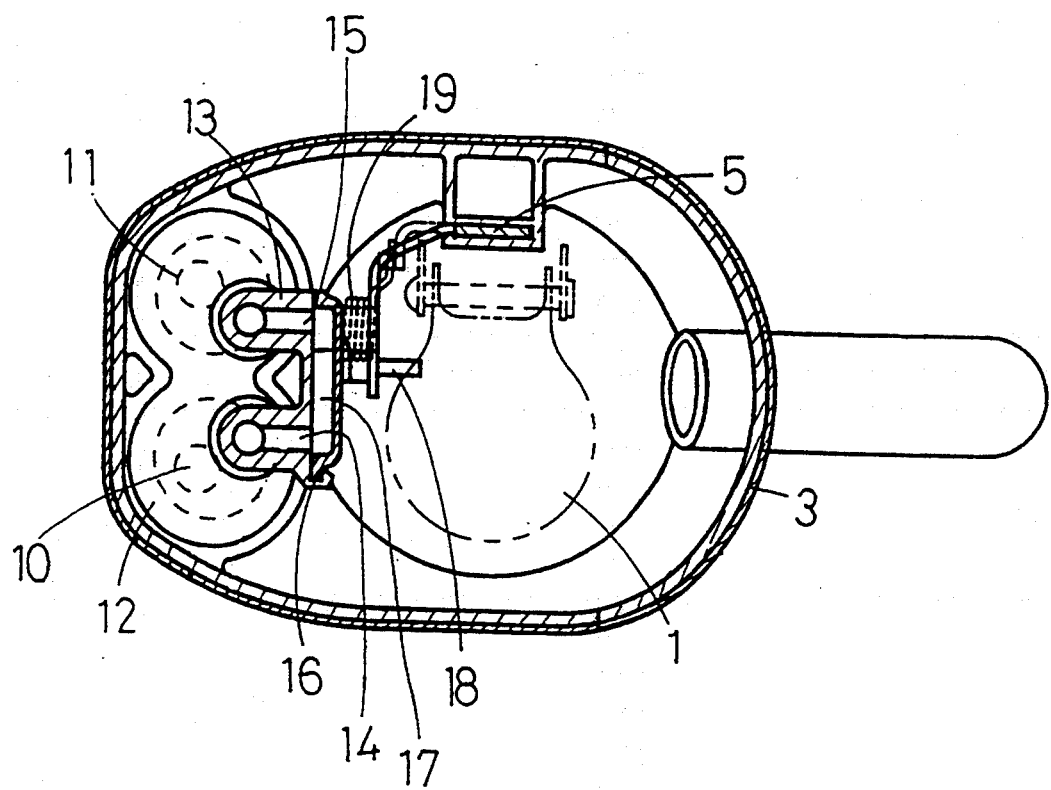
FIG. 2 is a cross-sectional view of a filler neck taken along the line I—I of FIG. 1.
Figure 3:
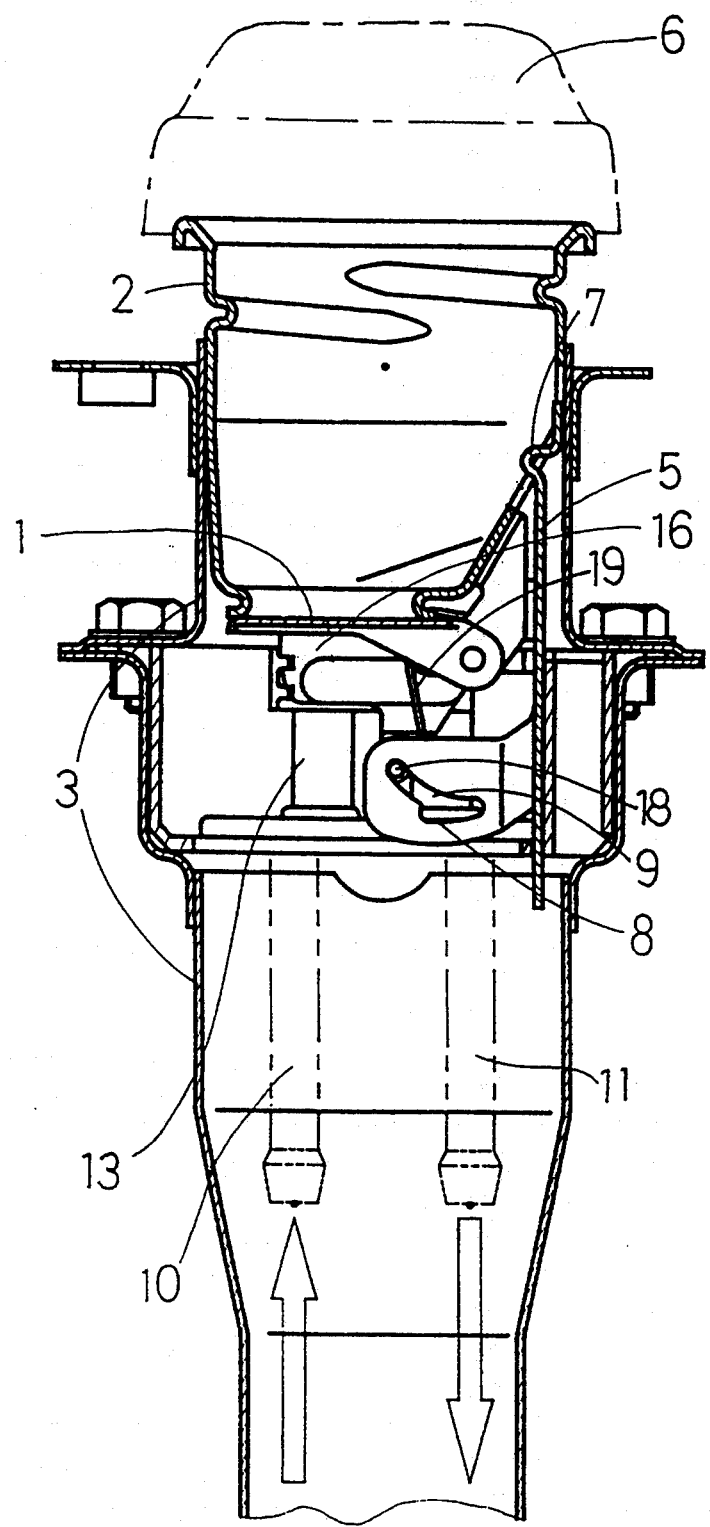
FIG. 3 is a cross-sectional view of the filler neck taken along the line II—II of FIG. 1, showing a state of a ventilation line when it is opened.
Figure 4:
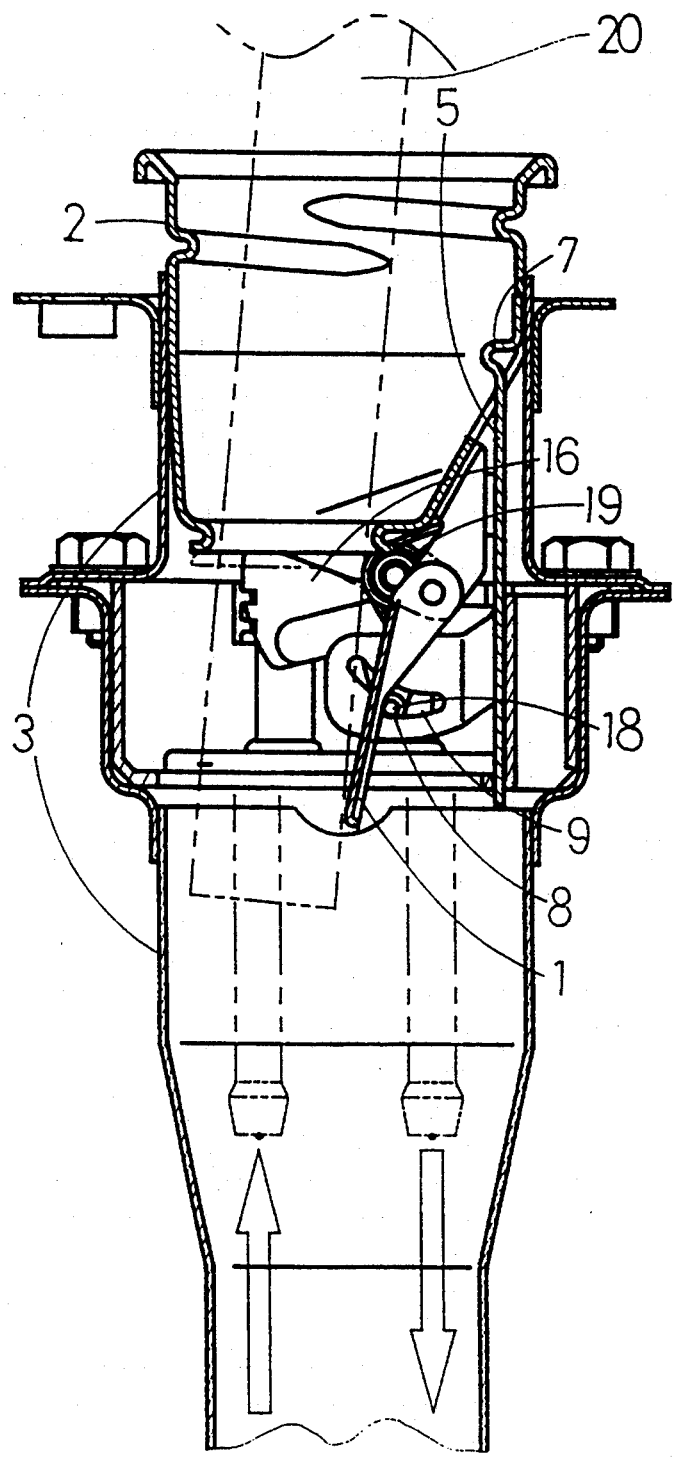
FIG. 4 is a cross-sectional view of the filler port taken along the line II—II of FIG. 1, showing a state of the ventilation line when it is closed.
Figure 5:
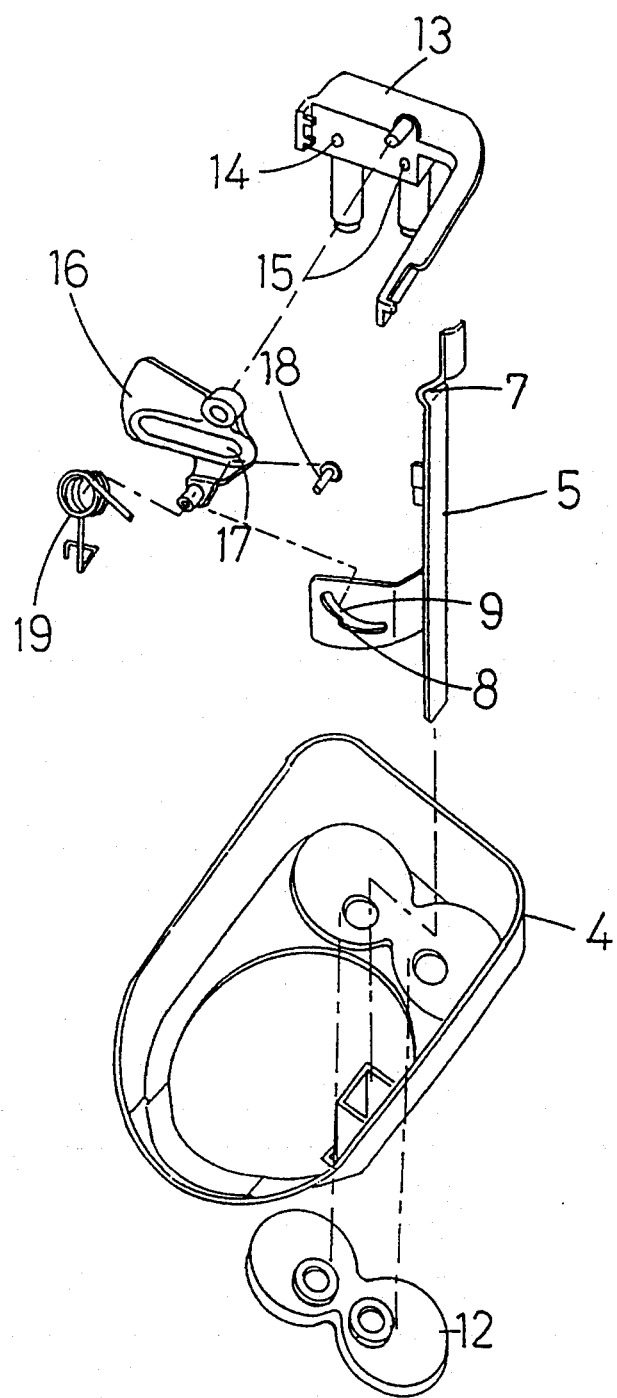
FIG. 5 is an exploded perspective view of essential parts constituting the means shown in FIG. 1.

FIG. 1 is a cross-sectional view of a filler port and the surroundings. In a filler neck communicating with the filler port, there is provided a ventilation line opening/closing means according to the invention. This opening/closing means employs a rotatable valve as an opening/closing valve. FIG. 2 is a cross-sectional view of the filler neck taken along the line I—I in FIG. 1. FIG. 3 is a cross-sectional view of the filler neck taken along the line II—II in FIG. 1, showing a state of the opening/closing valve when it is opened. FIG. 4 is a cross-sectional view of the filler neck taken along the line II—II in FIG. 1, showing a state of the opening/closing valve when it is closed. FIG. 5 is an exploded perspective view of essential parts constituting the ventilation line opening/closing means.

At first, a structure of the ventilation line opening/closing means will be described with reference to FIGS. 1, 2 and 5.

A filler neck 3 comprises upper and lower portions. A cap retainer 2 having a shutter 1 disposed at the bottom is inserted into the upper portion of the filler neck 3 which is integrally connected to the lower portion via a valve casing in the vicinity of the bottom of the cap retainer. The shutter 1 is rotatably connected to the cap retainer 2 to move downwardly. A slide plate 5 is provided extending through a side wall of the cap retainer 2 slidably within the valve casing 4. The slide plate 5 includes a pressing portion 7 to be forced downwardly by a filler cap 6, which pressing portion is formed near the upper end portion of the slide plate 5. The slide plate 5 also includes on its inner surface an inwardly-extending member with a cam groove 9 of a downwardly-curved arcuate shape. The groove 9 includes a stepped shoulder 8 serving as a stopper at the groove bottom.

A pair of pipes 10 and 11 are provided on the bottom of the valve casing 4, the pipes connecting a fuel tank and a canister with each other. Ventilation line openings 14 and 15 of the respective pipes are opened below the bottom of the cap retainer 2. Reference numeral 12 is a sealing plate. A communication block 13 is connected to the valve casing 4. The communication block 13 includes a rotatable valve plate 16 swingably movable with respect to the block 13. A rotatable valve plate 16 is adapted to closedly contact with a side wall of the communication block 13 where both the ventilation line openings 14 and 15 exist. The rotatable valve plate 16 operates at the location below the cap retainer 2 or in the vicinity of an upper end of the lower portion of the filler neck. The valve plate 16 includes an elongated groove 17 for communicating the ventilation line openings with each other therethrough. The valve plate 16 can shut the ventilation line openings when it rotatingly moves to displace the groove 17 from the openings. Thus, the rotatable valve plate 16 operates to open or close the ventilation line.

The rotatable valve plate 16 is provided with a projecting pin 18 slidably movable within the cam groove 9 of the slide plate 5. The rotatable valve plate 16 is biased with respect to the slide plate 5 by means of a spring 19 in such a manner that they forcibly react against each other. A torsion coil spring may be used as the spring 19 in the illustrated embodiment.

An operation of the ventilation line opening/closing means using the rotatable valve plate will now be explained.

In a state that the filler cap 6 is tightly fitted in the filler port 2 at the time of traveling of the automobile, as shown in FIG. 3, the shutter 1 of the cap retainer is closed and the slide plate 5 is in the lowered condition. The ventilation line openings 14 and 15 of the pipes 10 and 11 respectively leading to the fuel tank and the canister are communicated with each other through the groove 17 of the rotatable valve plate 16.

FIG. 4 diagrammatically illustrates a state in which the filler cap 6 is detached and a fuel supplying nozzle 20 is inserted in a filler port at the time of fuel supply. In the figure, the shutter 1 is pushed downwardly for rotation by the fuel supplying nozzle 20. The shutter 1 moves the pin 18 to turn the rotatable valve plate 16 so that the ventilation line openings 14 and 15 disposed side by side are closed by the rotatable valve plate 16, thereby interrupting the ventilation line. At the same time, the spring 19 is pressed by the rotatable valve plate 16 to increase its resiliency. As a result, the slide plate 5 connected to the rotatable valve plate 16 through the spring 19 is moved upwardly. The slide plate 5 moves, while the pin 18 of the rotatable valve plate 16 slides along the lower edge of the cam groove 9 beyond the stepped shoulder 8 in a direction toward the slide plate 5.

When the fuel supplying nozzle is withdrawn out of the filler port, the shutter 1 automatically returns to a position indicated by a two-dot chain line in FIG. 4 by the spring biasing force. The rotatable valve plate 16, however, cannot rotate against the biasing force of the spring 19 because the pin 18 of the rotatable valve plate 16 is engaged with the stepped shoulder 8 of the cam groove 9. Accordingly, the ventilation line is kept in a closed state. At this time, the slide plate 5 is also retained in a state that it is pushed upwardly. The contour and dimensions of the cam groove 9, and the location of the stepped shoulder 8 are selectively chosen so that a biasing pressure enough large to inhibit the slide plate 5 from moving downwardly can be obtained. Under the above-described condition, the rotatable valve plate does not operate in response to the insertion or extraction of the fuel supplying nozzle. Therefore, the closed state of the ventilation line can be maintained even when the fuel supplying nozzle is inserted for additional fuel supply and extracted after completion of the additional fuel supply. It is therefore possible to restrict the fuel level in the fully-filled tank continuously from the start to the end of the fuel supply operation.

After the completion of the fuel supply operation, when the filler cap 6 is fitted into the filler port by a screwing operation, the pressing portion 7 of the slide plate 5 in the lifted condition is moved downwardly by the filler cap 6. The pin 18 engaged with the stepped shoulder 8 of the cam groove 9 is released due to the movement of the slide plate 5, so that the rotatable valve plate 16 is forced from the resiliency of the spring 19 and rotates to open the ventilation line again. The slide plate 5 is surely moved downwardly to return to the state of FIG. 3, by the pressing force resulting from the operation of tightly fitting the filler cap 6 into the filler port and because the biasing force of the spring 19 applied to the slide plate 5 is weakened due to the rotation of the rotatable valve plate 16.

As mentioned above, the ventilation line closed at the time of the initial insertion of the fuel supplying nozzle into the filler port which is normally regarded as the start of the fuel supply operation, is maintained in the closed state during the fuel supply operation including the succeeding additional fuel supply. The fitting operation of the filler cap performed at the end of the fuel supply operation is detected as the completion of the fuel supply operation. The ventilation line is thus opened again. By realizing optimum timing of operation of the opening/closing valve, it is possible to set in the ventilation line the advantageous ventilation line opening/closing means effective in restricting the fuel level when the fuel tank is full.

Next, a ventilation line opening/closing means employing a slide valve as the opening/closing valve will be explained. The slide valve has both the functions of the slide plate and the rotatable valve plate in the above-described embodiment of the ventilation line opening/closing means of the rotatable valve type, and enables the number of component parts of the means to be reduced and the structure to be simplified. The ventilation line opening/closing means shown in FIGS. 6 to 9 is of a type in which engagement pins of the slide valve are directly pushed up by a shutter.

In the ventilation line opening/closing means, a cylindrical valve casing 23 is attached to an inner wall of a filler neck 22 comprising upper and lower portions integrally connected to each other in the vicinity of the bottom of a cap retainer 21 as shown in FIGS. 6 to 9. Pipes 24 and 25 respectively extending from a fuel tank and a canister are coupled to an inner side surface of the valve casing 23. A pair of ventilation line openings 26 and 27 are provided in the surface of the valve casing 23, one being located above the other. The slide valve 28 comprises disk-like upper and lower closure plates 30 and 31 having packings 29 fitted therearound, a rod-like member 32 for connecting the upper and lower closure plates 30 and 31 to each other, a crank-shaped intermediate portion 33 located above the upper closure plate 30, a pressing portion 34 connected to the upper closure plate 30 via the intermediate portion 33, and engagement pins 35 projecting from both sides of the intermediate portion 33. The slide valve 28 may be formed by integral molding. The slide valve 28 is vertically movable within the valve casing 23 while sliding the upper and lower closure plates 30 and 31 in contact with the inner wall of the valve casing 23. The intermediate portion 33 has functions to integrally move the upper and lower closure plates 30, 31 and the pressing portion 34 of which axial lines of vertical movement are different from each other, and to restrict the downward movement of the slide valve 28 by engaging with an upper end of the valve casing 23.

A shutter 36 is integrally formed with hooks 37 which engage with the engagement pins 35 of the slide valve 28 from the lower sides thereof so as to press the pins. The shutter 36 pivotally moves downwardly toward the valve casing 23 from a position where it closes a lower opening of the cap retainer 21. The shutter 36 is pushed for rotation by a fuel supplying nozzle inserted from a filler port. The shutter 36 returns to the original position where it closes the lower opening of the cap retainer 21 when the fuel supplying nozzle is extracted from the filler port, because a coil spring 39 wound around a rotary shaft 38 urges the shutter 36 upwardly. As understood from FIG. 8, in the case where a distance of upward movement of the slide valve 28 is so predetermined that the upper closure plate 30 does not come out of the valve casing 23, a space 40 defined by the upper and lower closure plates 30, 31 and the valve case 23 is not communicated with the exterior of the valve casing, and the fuel does not enter the ventilation line through the valve casing 23.

Figure 6:
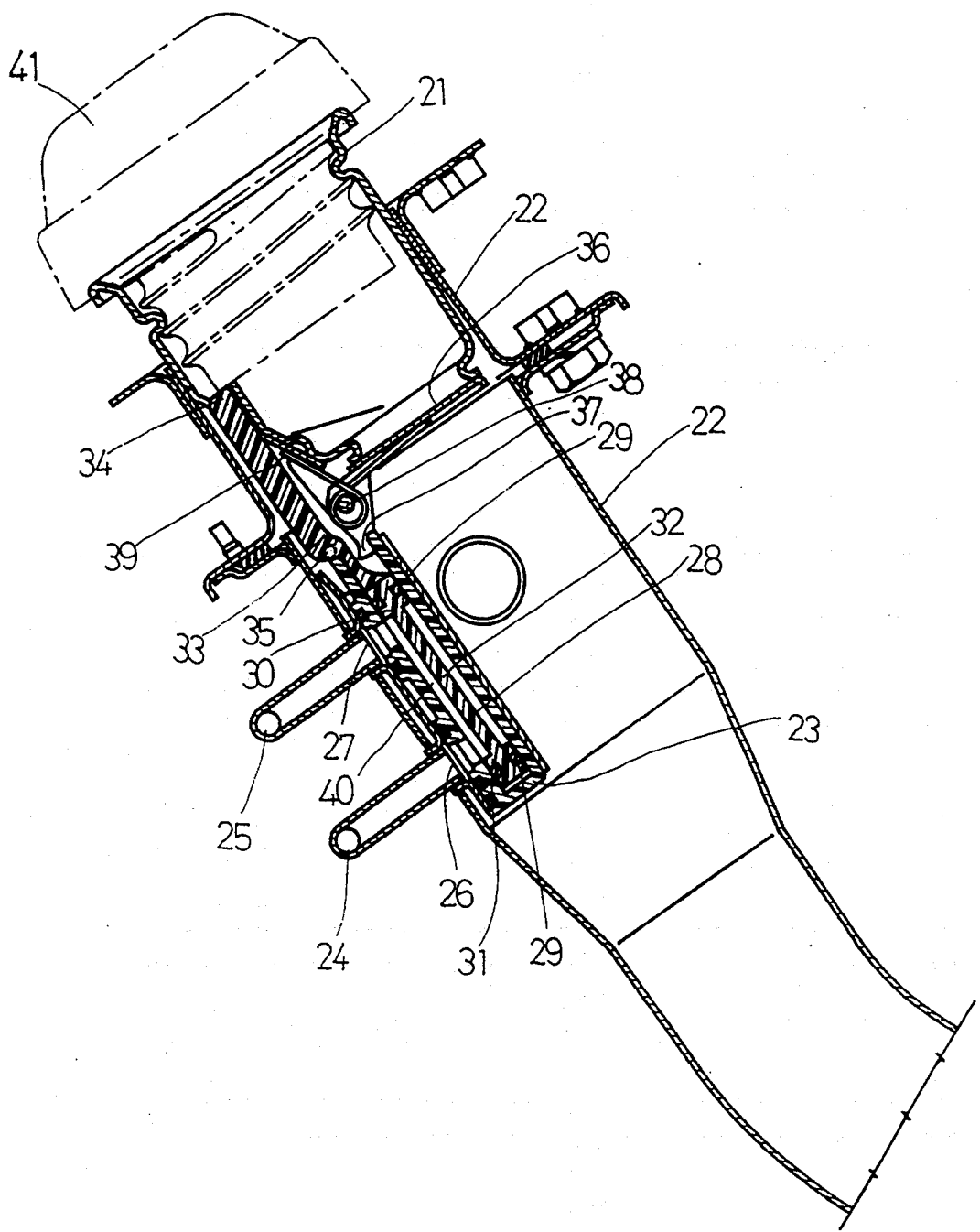
FIG. 6 is a cross-sectional view of the filler port and its surroundings, showing an opening state of a ventilation line of a ventilation line opening/closing means having a slide-type opening/closing valve of which engagement pin is pushed upwardly by a shutter.

At the time of running of the automobile, as illustrated in FIG. 6, the slide valve 28 is located at a lowered position where it is in contact with the bottom of the valve casing 23. For the reasons, the ventilation line openings 26 and 27 are communicated with each other through the space 40 in the valve casing 23 defined by the lower closure plate 31 and the upper closure plate 30. At this time, the pressing portion 34 is located at a position where it contacts with a lower end of a filler cap 41. Thus, the slide valve 28 is securely held between the bottom of the valve casing 23 and the filler cap 41, so that there is no possibility that the slide valve 28 will erroneously move during running of the automobile.

Figure 7:
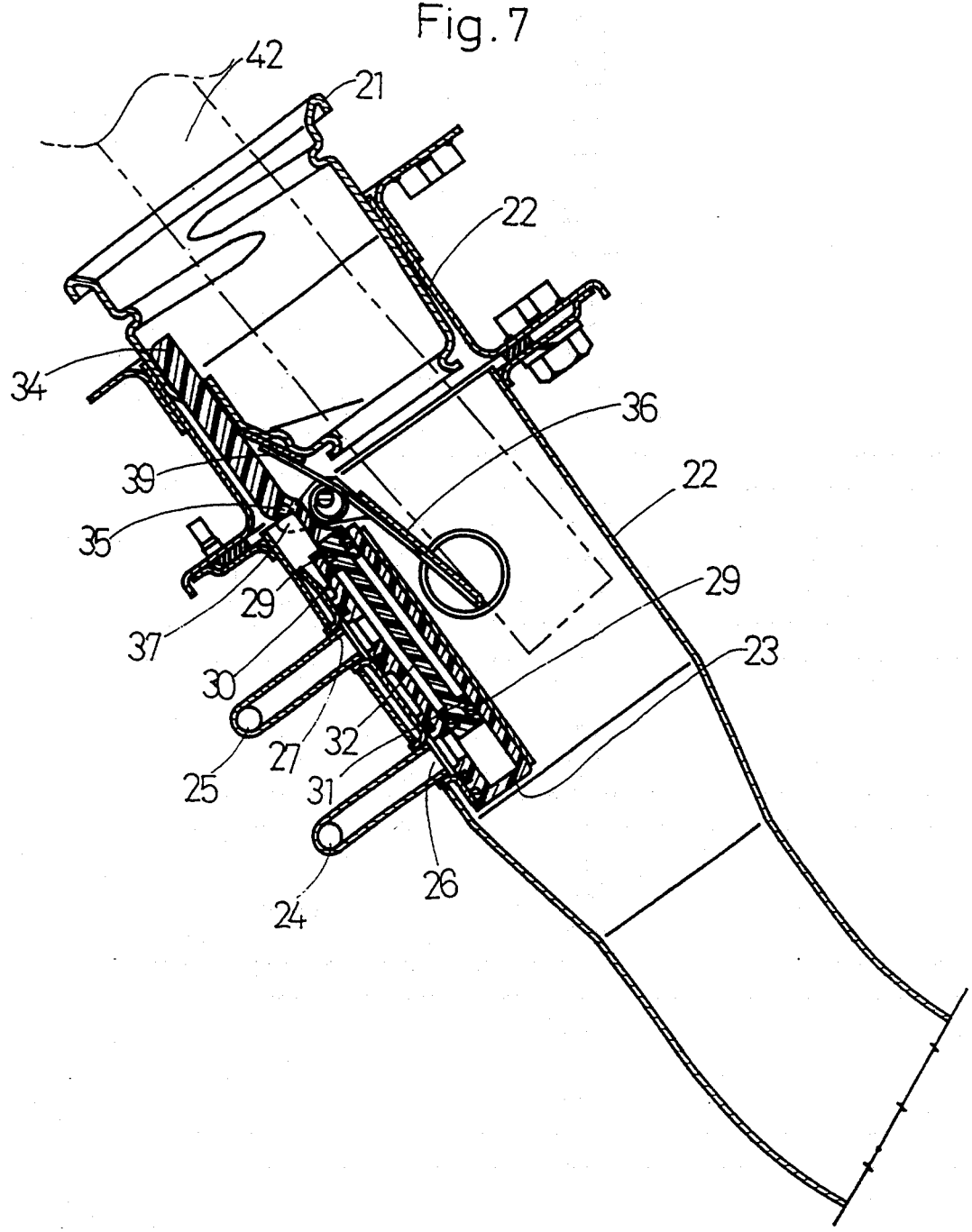
FIG. 7 is a cross-sectional view of the filler neck, showing a state of the ventilation line of the means shown in FIG. 6 when it is closed.
Figure 8:
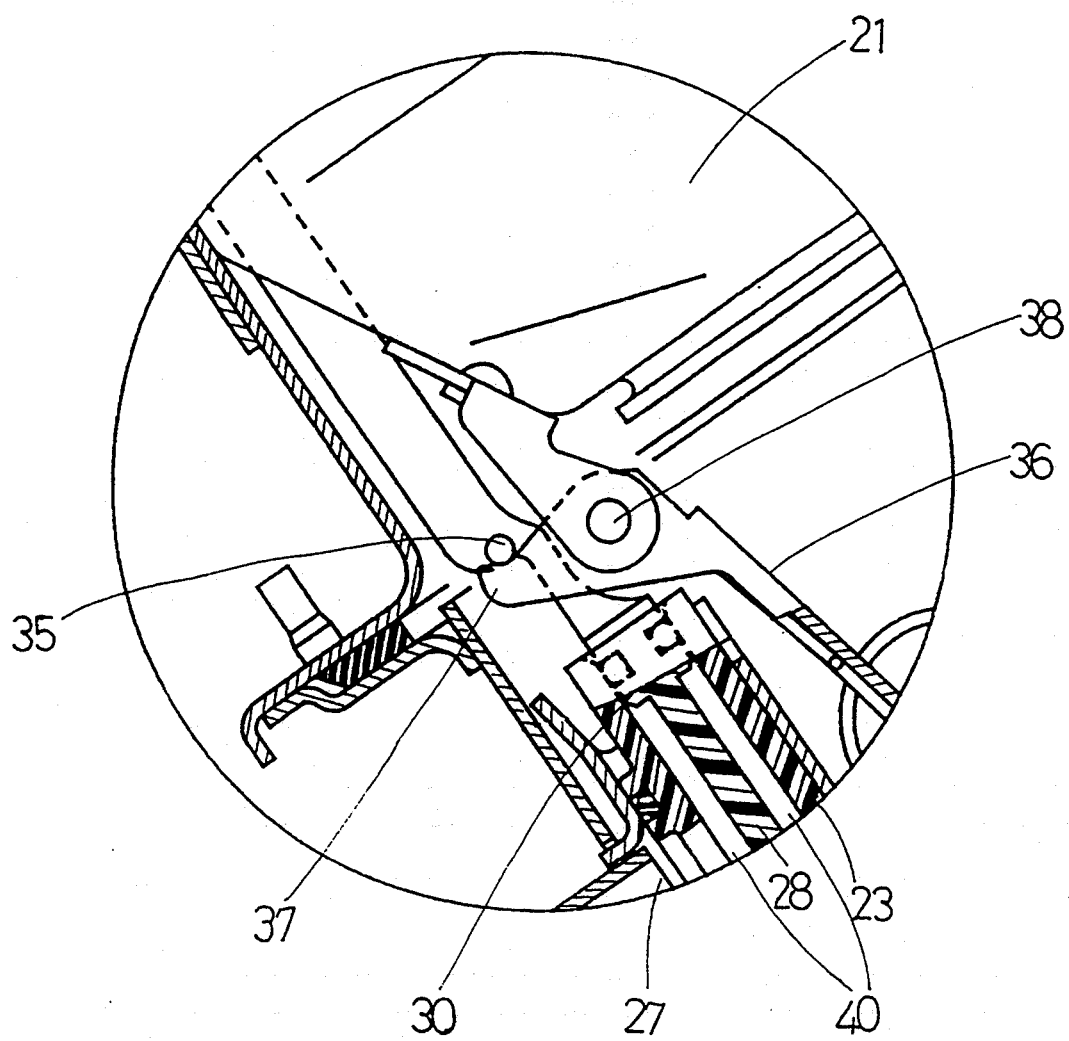
FIG. 8 is an enlarged cross-sectional view of essential parts, illustrating the engagement pin and its surroundings of FIG. 7 on an enlarged scale.
Figure 9:
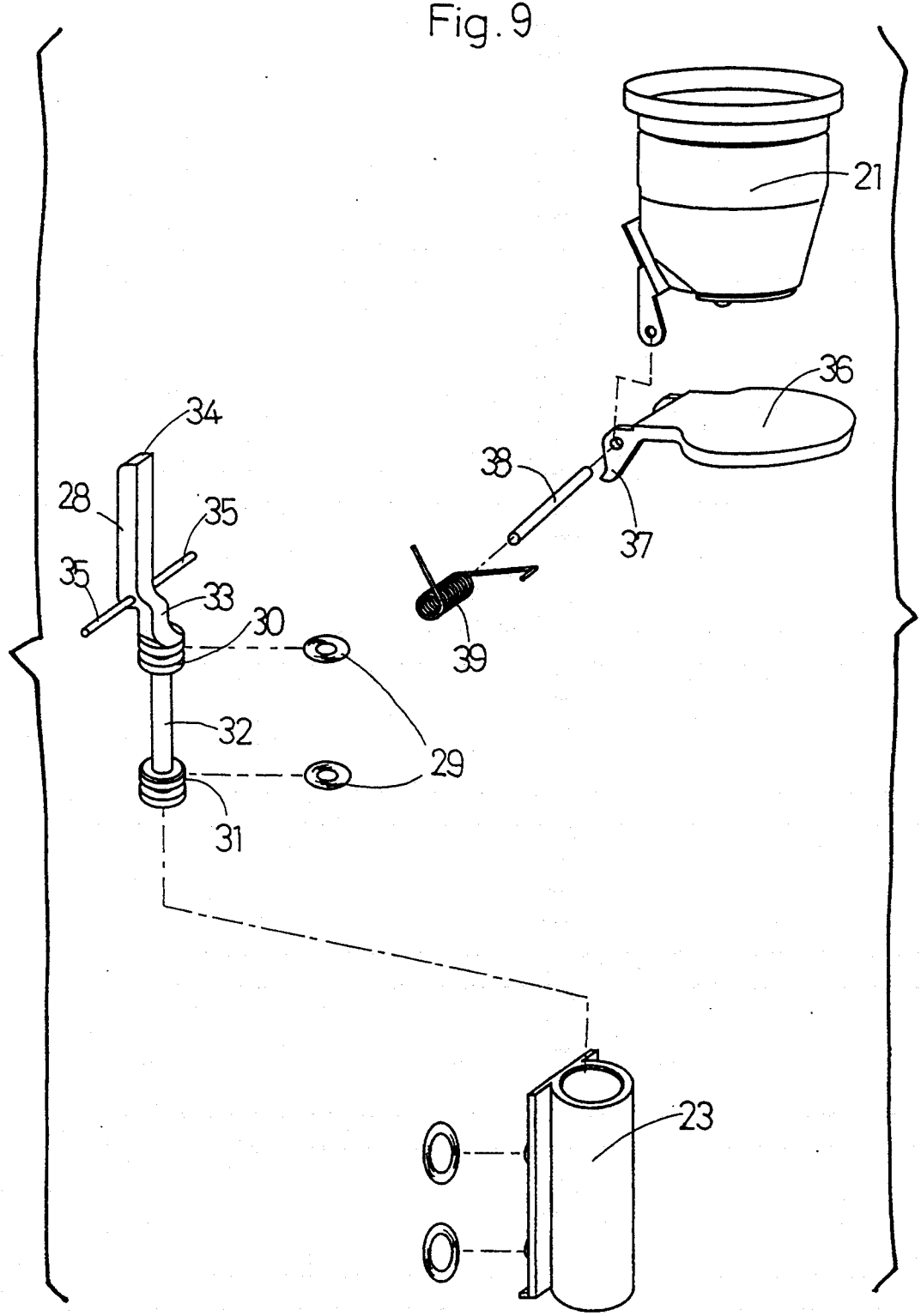
FIG. 9 is an exploded perspective view of principal portions constituting the means of FIG. 6.

At the time of fuel supply, as shown in FIG. 7, when the filler cap is disconnected from the cap retainer 21 and the fuel supplying nozzle 42 is inserted into the filler neck 22 (indicated by the two-dot chain line in FIG. 7), the shutter 36 is pushed by the fuel supplying nozzle 42 so as to rotate downwardly. Simultaneously, the hooks 37 moves upwardly while the shutter 36 moves downwardly and abut against the lower sides of the engagement pins 35, thereby forcing the slide valve 28 upwardly. Consequently, the lower closure plate 31 moves upwardly to pass over the lower ventilation line opening 26, so that the ventilation line is closed. Alternatively, it may be appreciated that either of the ventilation line openings is closed by the lower closure plate 31 or the upper closure plate 30 to thereby shut the ventilation line. However, this measure is not preferable because the positioning of the upper or lower closure plate for closing the ventilation line opening is too difficult to close the ventilation line opening completely, which results in an operation failure. The shutter 36 is opened or closed in response to insertion or extraction of the fuel supplying nozzle. Meanwhile, since the slide valve 28 is stationary stably at the lifted position without operating in response to the opening/closing of the shutter 36, it is possible to restrict the fuel level in the fully-filled fuel tank during the so-called additional fuel supply.

When the fuel supply is completed and the filler cap 41 is tightly fitted in the filler port, as shown in FIG. 6, the slide valve 28 is urged downwardly by the filler cap 41 to return to its original position. The lower closure plate 31 of the slide valve 28 passes over the lower ventilation line opening 26 to come in contact with the bottom of the valve casing 23. Under such condition, the slide valve 28 is kept stationary because the pressing portion 34 is also pressed by the filler cap 41. In other words, unless the filler cap 41 is fitted into the cap retainer completely, the ventilation line cannot be opened because the lower closure plate 31 is positioned between the upper and lower ventilation line openings 26 and 27. As mentioned above, it is preferable that the upper and lower closure plates of the slide valve are located with an interval which is substantially equal to a distance between the ventilation line openings, the lower end of the valve casing is sealed at a position lower than the lower ventilation line opening by a height of the lower closure plate, and the upper end of the valve casing is opened and extended upwardly from the upper closure plate by a distance of movement of the slide valve.

Next, a ventilation line opening/closing means shown in FIGS. 10 to 13 is of a type in which an engagement pin of a slide valve is indirectly pushed upwardly via a coil spring by a shutter.

Figure 11:
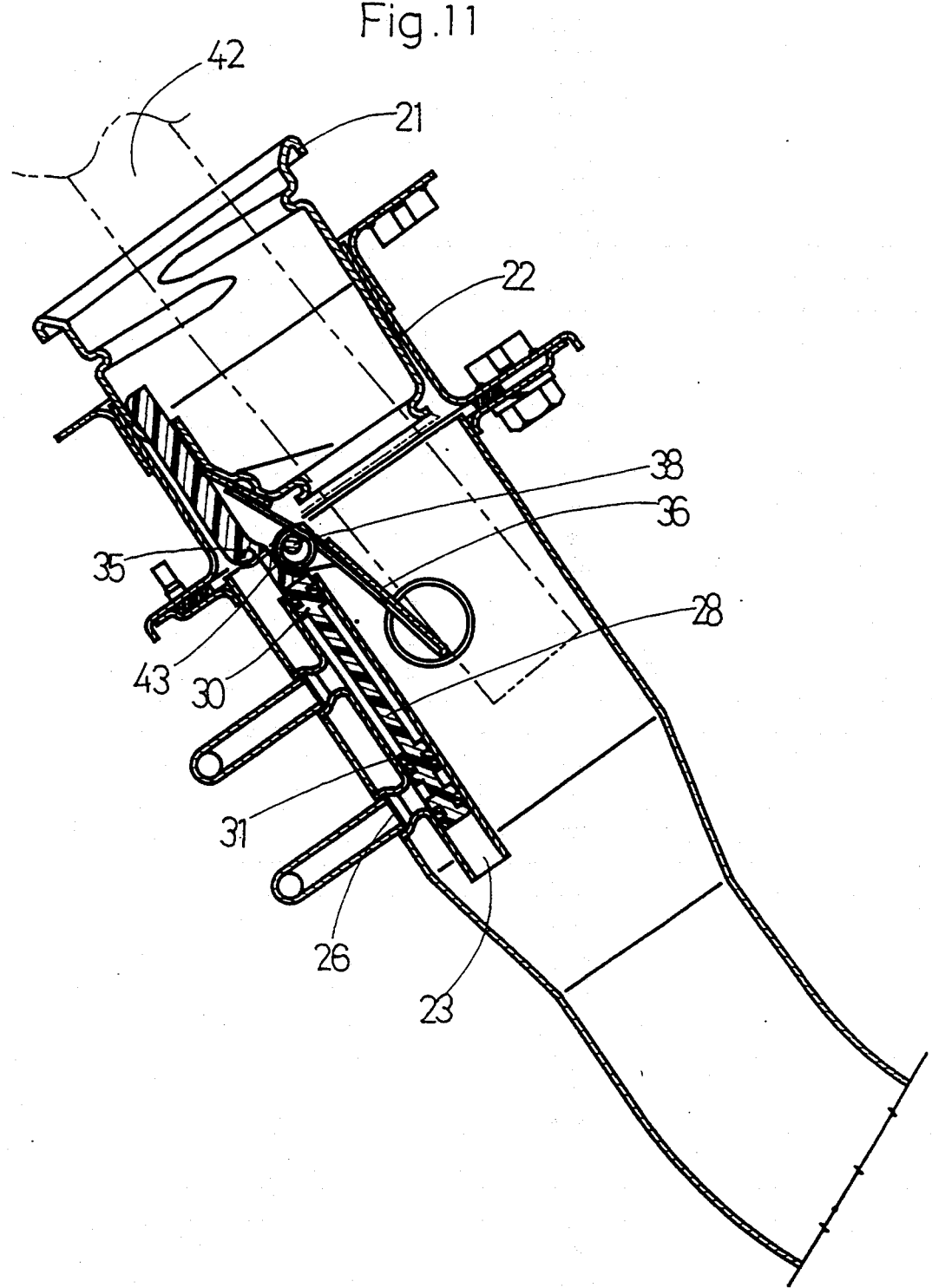
FIG. 11 is a cross-sectional view of the filler neck, showing a state of the ventilation line of the means in FIG. 10 when it is closed.
Figure 12:
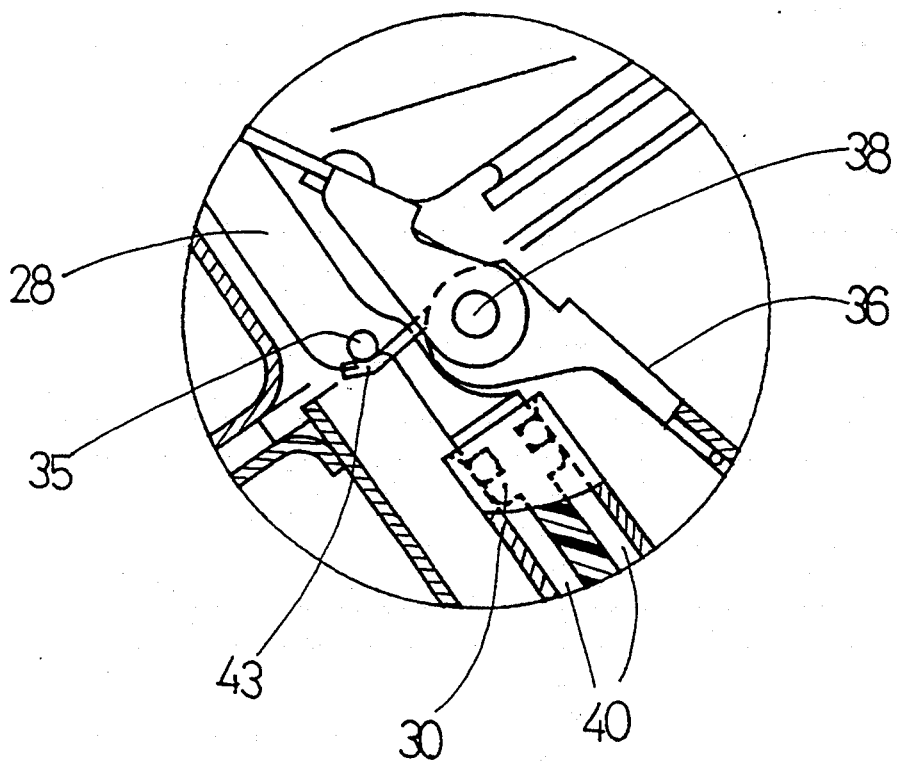
FIG. 12 is an enlarged cross-sectional view of essential parts, showing the engagement pin and its surroundings of FIG. 11 on an enlarged scale.
Figure 13:
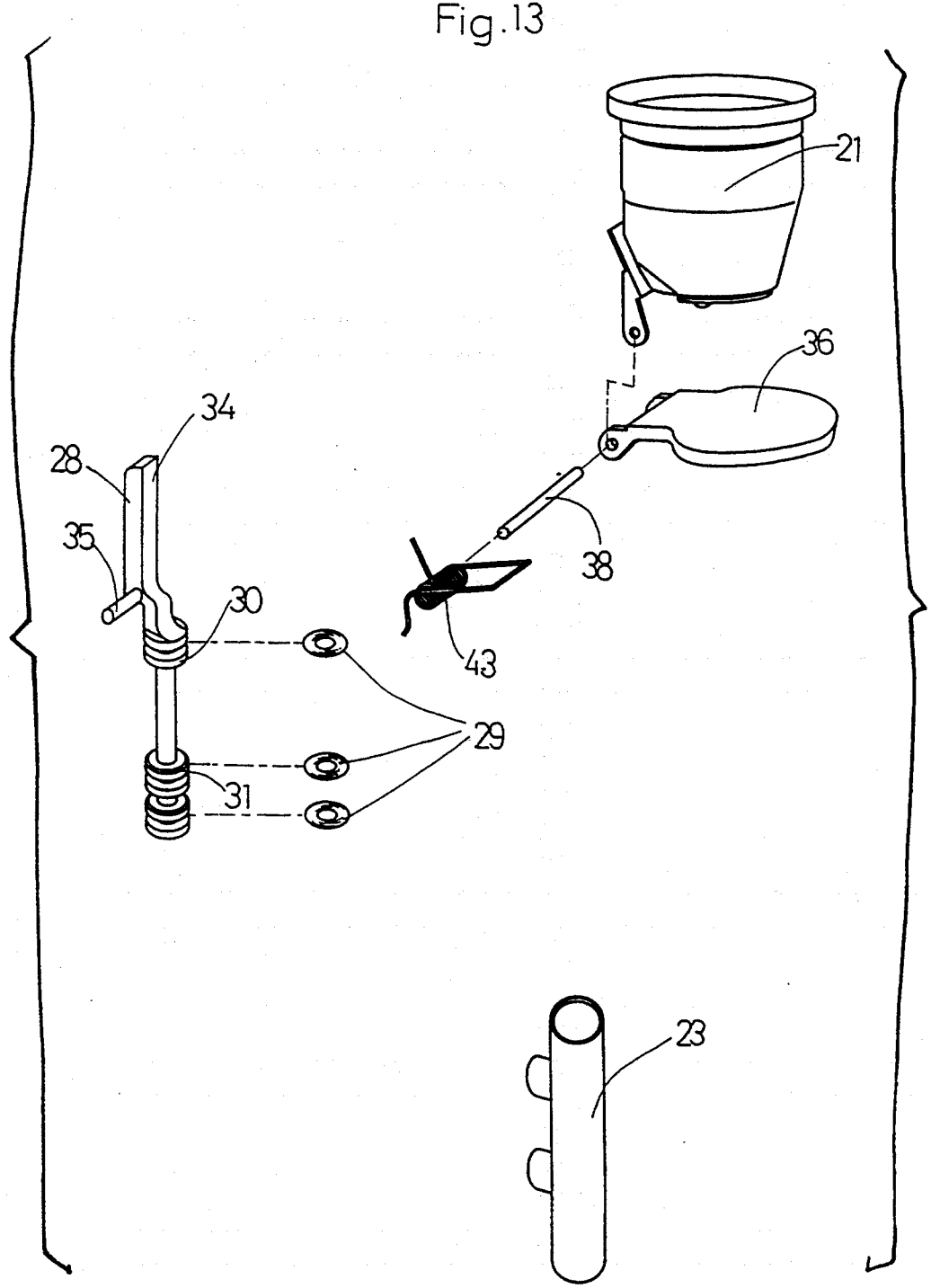
FIG. 13 is an exploded perspective view of principal parts constituting the means of FIG. 10.

The ventilation line opening/closing means has a structure similar to the above-mentioned ventilation line opening/closing means. A different point between them is that a member for urging the engagement pin 35 of the slide valve 28 from the lower side thereof is the coil spring 43 attached to a rotary shaft 38 of the shutter 36. This coil spring 43 is arranged to have a spring pressure enough to make the engagement pin 35 and the shutter 36 react against each other. The slide valve 28 is not normally pushed upwardly because the coil spring 43 is not in contact with the engagement pin 35. However, when the shutter 36 is pushed downwardly for rotation by a fuel supplying nozzle, the coil spring 43 comes in press contact with the engagement pin 33. In the case where the spring pressure exceeds a certain value, the coil spring 43 urges the engagement pin 35 from the lower side thereof with the strong spring pressure, so that the slide valve 28 is moved upwardly. Thereafter, as shown in FIG. 11, when the fuel supplying nozzle is drawn out of a filler port, the shutter 36 returns to its original position by the urging force of the coil spring 43. The slide valve 28 is kept stationary at a position where an upper closure plate 30 is not detached from a valve casing, thereby interrupting a ventilation line with a lower closure plate 31.

Figure 10:
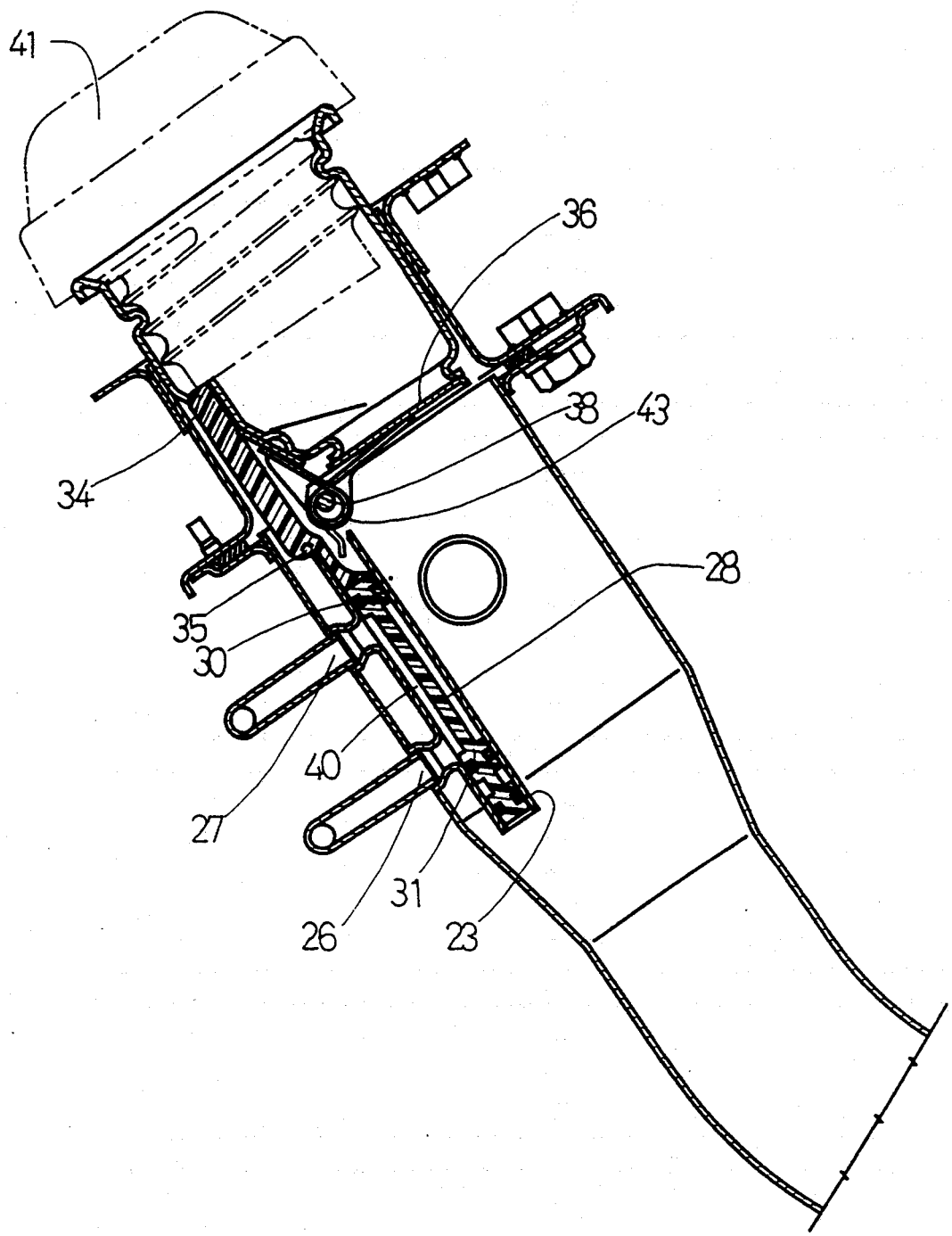
FIG. 10 is a cross-sectional view of the filler neck, showing an opening state of a ventilation line of a ventilation line opening/closing means having a slide-type opening/closing valve of which engagement pin is pushed upwardly by a coil spring.

At the time of running of the automobile, as shown in FIG. 10, the slide valve 28 is lowered at a position of the bottom of the valve casing 23. As a result, the ventilation line openings 26 and 27 are communicated with each other via a space 40 within the valve casing 23 defined by the lower closure plate 31 and the upper closure plate 30. At this time, the pressing portion 34 is located at a position where it contacts with the lower end of a filler cap 41. For the reasons, the slide valve 28 is securely held between the valve casing 23 with which an intermediate portion 33 contacts and the filler cap 41, so that there is no possibility that the slide valve 28 will erroneously move during running of the automobile.

At the time of fuel supply, as shown in FIG. 11, when the filler cap is disconnected from a cap retainer 21 and the fuel supplying nozzle 42 is inserted into a filler neck 22 (the two-dot chain line in FIG. 11), the shutter 36 is pushed downwardly for rotation by means of the fuel supplying nozzle 42. Simultaneously, the increased spring pressure of the coil spring 43 urges the engagement pin 35 from the lower side thereof, so as to move the slide valve 28 upwardly. Thus, the lower closure plate 31 passes over the lower ventilation line opening 26 to move upwardly, thereby interrupting the ventilation line.

When the fuel supply is completed and the filler cap 41 is tightly fitted in the cap retainer, the slide valve 28 is pressed downwardly by the filler cap 41 to return to its initial position as illustrated in FIG. 10. The lower closure plate 31 of the slide valve 28 passes over the ventilation line opening 26 to be located at the position of the bottom of the valve casing 23. Under such condition, the slide valve is kept stationary because the pressing portion 34 is pressed by the filler cap 41. Such relationships among the respective members of the ventilation line opening/closing means are similar to those of the above-described one that the upper and lower closure plates of the slide valve are located with an interval which is substantially equal to a distance between the ventilation line openings, the lower end of the valve casing is sealed at a position lower than the lower ventilation line opening end by a height of the lower closure plate, and the upper end of the valve casing is opened and extended upwardly from the upper closure plate by a distance of movement of the slide valve.

The valve case 23 used in the ventilation line opening/closing means of this type can easily be manufactured by hydraulic forming of metal.

In the next, a ventilation line opening/closing means shown in FIGS. 14 to 17 is of a type in which a slide valve is forced upwardly by a spring located below the slide valve.

Figure 14:
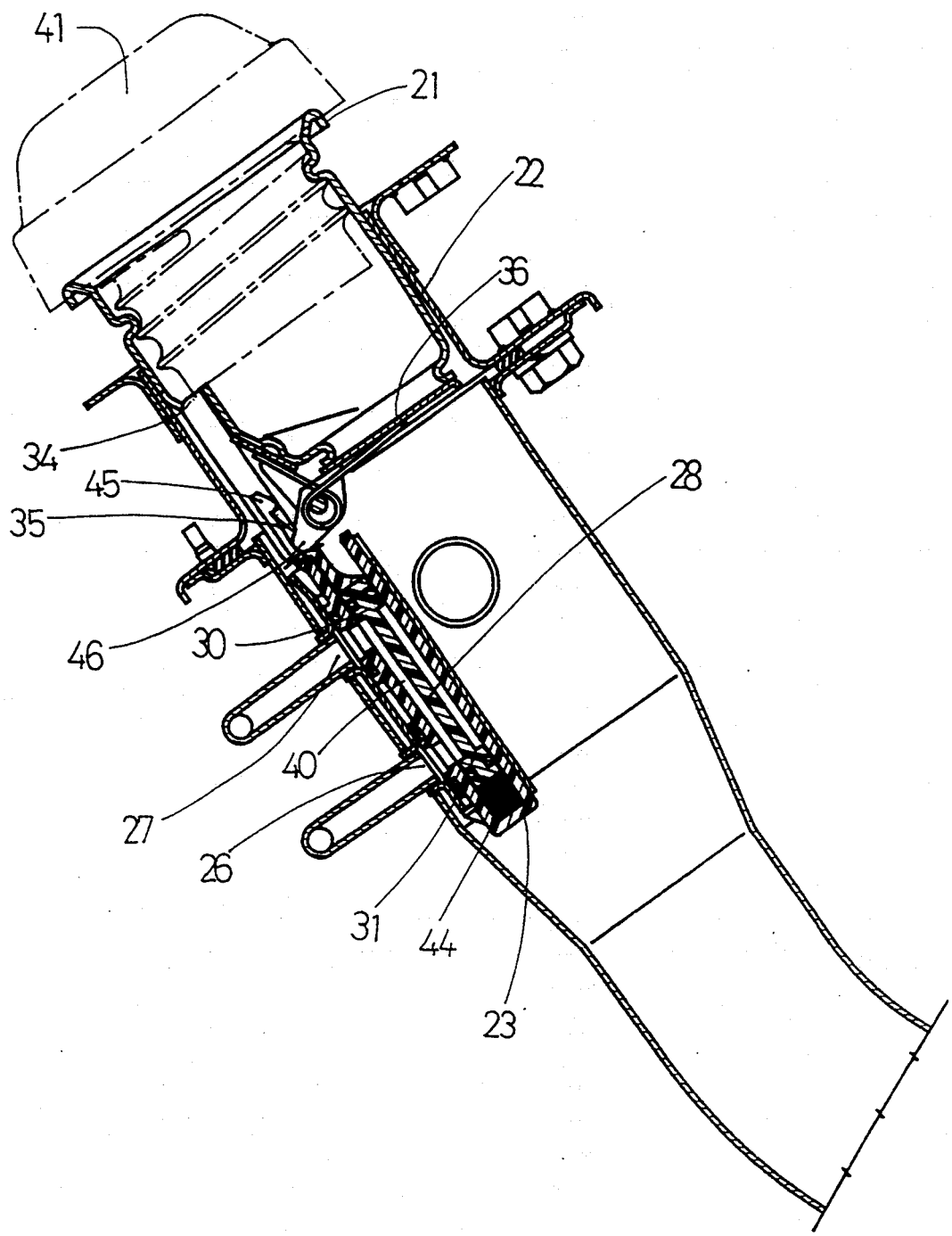
FIG. 14 is a cross-sectional view of the filler neck, showing an opening state of a ventilation line of a ventilation line opening/closing means having a slide-type opening/closing valve of which is pushed upwardly by a spring disposed at the lower end of the slide valve.
Figure 15:
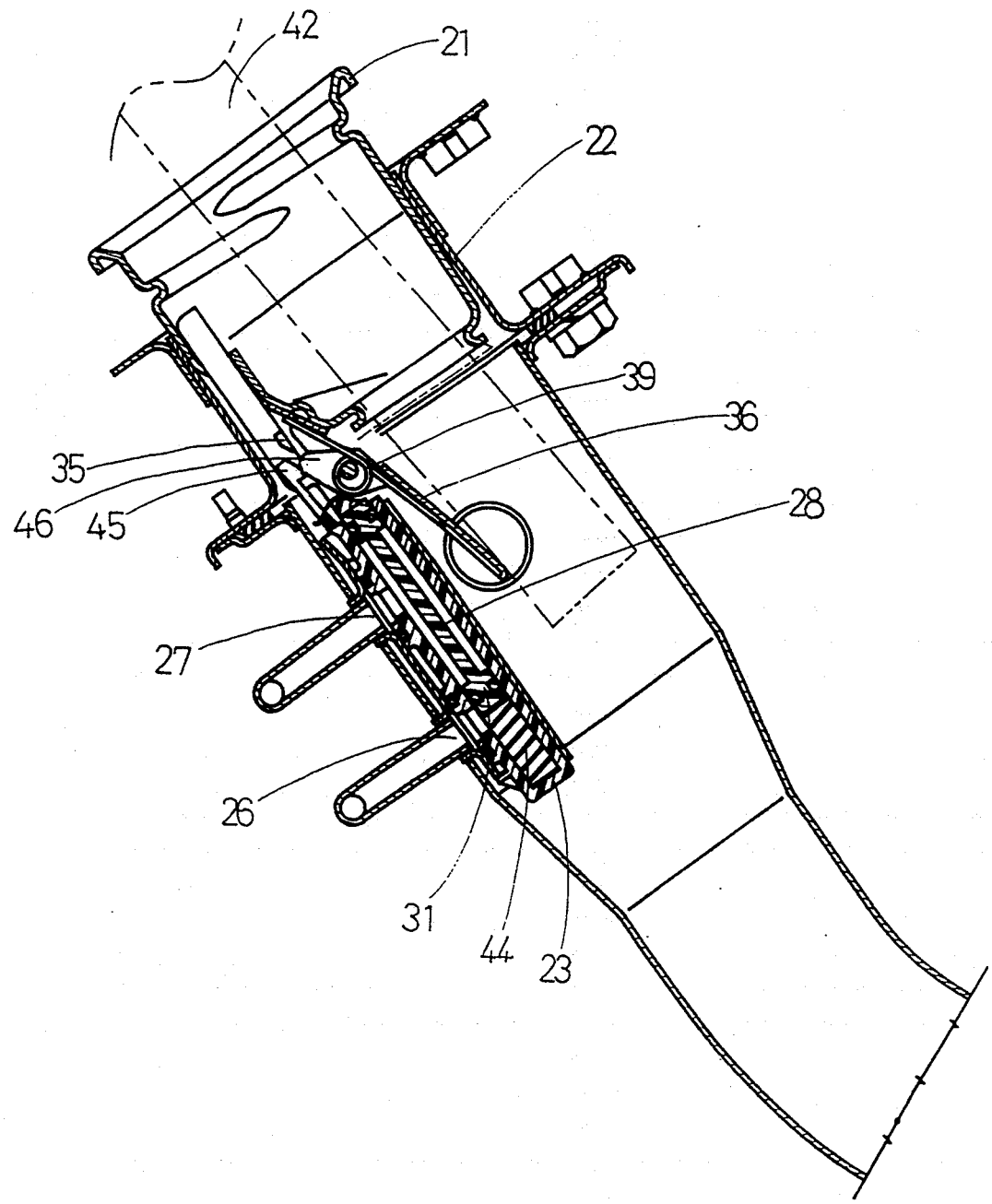
FIG. 15 is a cross-sectional view of the filler neck, showing a state of the ventilation line of the means in FIG. 14 when it is closed.
Figure 16:
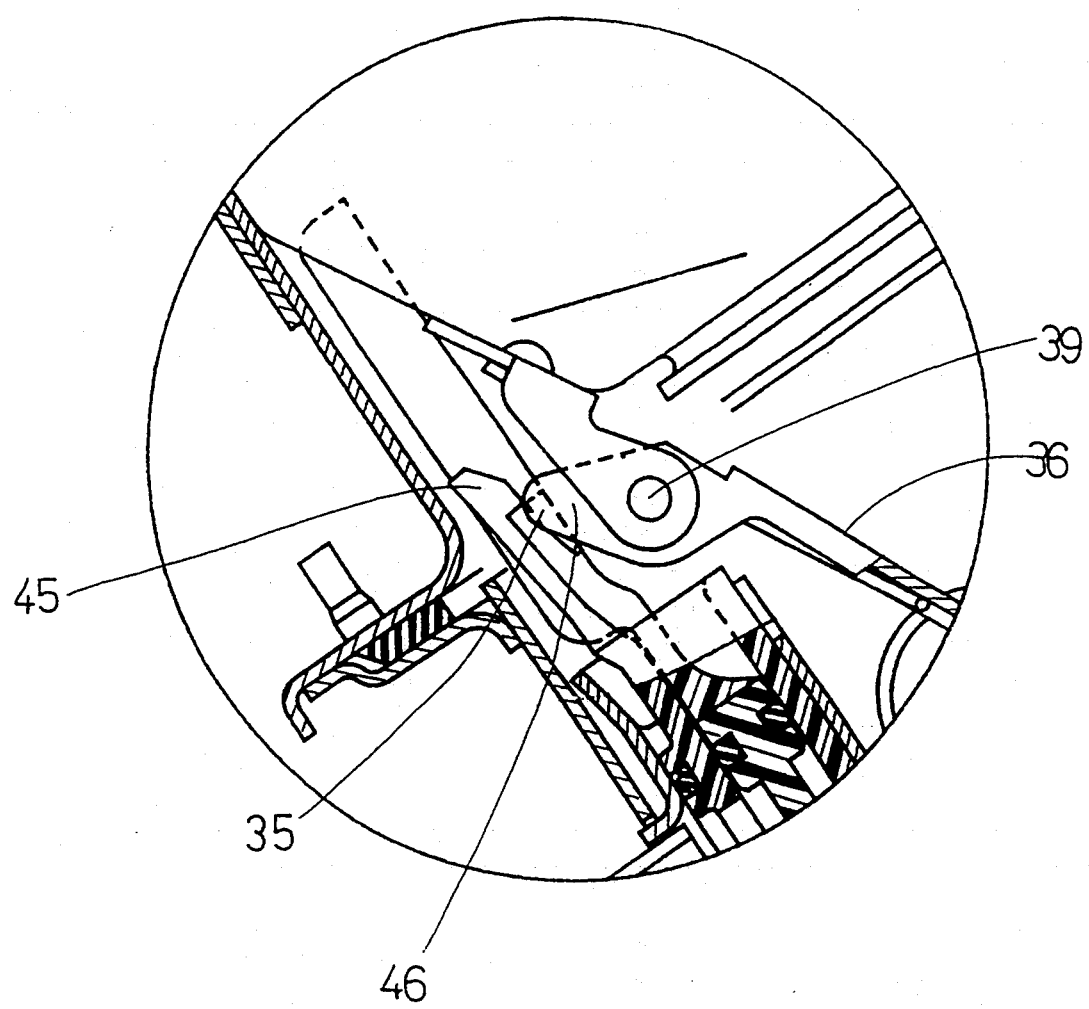
FIG. 16 is an enlarged cross-sectional view of essential parts, showing elastic arms and its surroundings on an enlarged scale.
Figure 17:
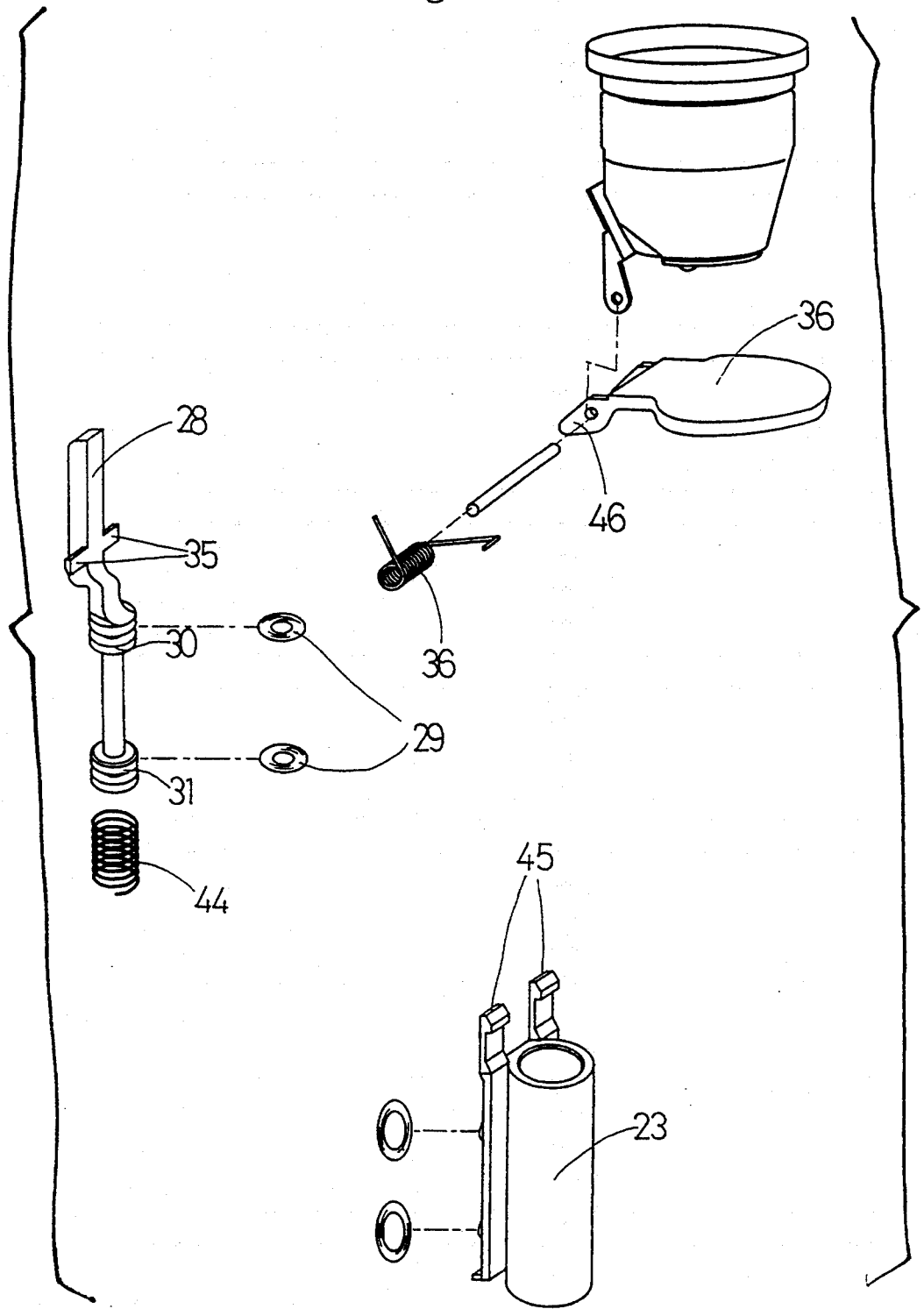
FIG. 17 is an exploded perspective view of principal parts constituting the means of FIG. 14.

This ventilation line opening/closing means, as shown in FIGS. 14 to 17, has a structure basically similar to that of the ventilation line opening/closing means using the previously-described slide valves. A different point between them is that the slide valve 28 is urged upwardly by means of a spring 44 retained at the bottom of a valve casing 23, and elastic arms 45 formed at an upper end of the valve casing 23 normally engage with engagement pins 35 of the slide valve 28 so as to suppress the slide valve 28. A shutter 36 is formed with hooks 46 which push the elastic arms 45 to release the engagement pins 35 when the shutter 36 is pushed for rotation by a fuel supplying nozzle. Since the slide valve 28 is always urged upwardly by the spring 44, it forcibly moves upwardly when it is thus released from being suppressed. The rotation of the shutter only gives an opportunity of the upward movement of the slide valve. The function of the rotation of the shutter is different from that of the shutter in the aforementioned ventilation line opening/closing means in that the shutter of this embodiment acts to push the slide valve upwardly. As shown in FIG. 15, when the fuel supplying nozzle is drawn out of a filler port under such a condition that the slide valve has been moved upwardly, the shutter 36 returns to its original position by the urging force of a coil spring 39, whereas the slide valve 28 is kept stationary at a position where an upper closure plate 30 thereof is not detached from the valve casing 23, and a lower closure plate 31 interrupts the ventilation line. The spring 44 is designed such that it does not expand any more in this state.

At the time of running of the automobile, as illustrated in FIG. 14, the elastic arms 45 of the slide valve 28 engage with the engagement pins 35 and the spring 44 is contracted at the bottom of the valve casing 23. Under such a condition, ventilation line openings 26 and 27 are communicated with each other via a space 40 within the valve casing 23 defined by the lower closure plate 31 and the upper closure plate 30. A pressing portion 34 of the slide valve 28 is located at a position where it abuts against the lower end of a filler cap 41. With such arrangement, even if the elastic arms 45 release the engagement pins 35, the slide valve 28 is securely held between the contracted spring 44 and the filler cap 41 so that the slide valve 28 will not move erroneously during running of the automobile.

At the time of fuel supply, as shown in FIG. 15, when the filler cap is disconnected from a filler port 21 and the fuel supplying nozzle 42 is inserted into the filler port 22 (the two-dot chain line in FIG. 15), the shutter 36 is pushed downwardly for rotation by means of the fuel supplying nozzle 42. Simultaneously, the hooks 46 press the elastic arms 45 to release the engagement pins 35 of the slide valve 28, so that the spring 44 is free from being contracted. Thus, when the expanding force of the spring 44 forcibly moves the slide valve 28 upwardly, the lower closure plate 31 passes over the lower ventilation line opening 26 to move upwardly, thereby interrupting the ventilation line.

When the fuel supply is completed and the filler cap 41 is tightly fitted in the cap retainer, the slide valve 28 is pressed downwardly by the filler cap 41 to return to its initial position as illustrated in FIG. 14. The slide valve 28 gradually contracts the spring 44. When the elastic arms 45 abuts against the engagement pins 35 to engage therewith, the lower closure plate 31 passes over the ventilation line opening 26 so as to open the ventilation line again. The slide valve 28 is kept stationary at that position between the spring 44 in the contracted state and the filler cap 41 because the pressing portion 34 is pressed by the filler cap 41. Such relationships among the respective members of the ventilation line opening/closing means are similar to those of the above-described ones that the upper and lower closure plates of the slide valve are located with an interval which is substantially equal to a distance between the ventilation line openings, the lower end of the valve casing is sealed at a position lower than the lower ventilation line opening by a length of the spring 44 in the contracted state, and the upper end of the valve casing is opened and extended upwardly from the upper closure plate by a distance of movement of the slide valve.

Finally, a ventilation line opening/closing means shown in FIGS. 18 to 21 is of a type in which a slide valve 47 of a plate having a substantially trapezoidal cross section slides within a valve casing 54 having a square cross section by means of a leaf spring 53.

A basic structure of this ventilation line opening/closing means is similar to those of the ventilation line opening/closing means having the above-described slide valves. By using the plate having the substantially trapezoidal cross section as the slide valve 47, it becomes possible to realize the more simplified and stabler opening/closing means. The slide valve 47 is of the plate having the substantially trapezoidal cross section, and provided with an upper projection 49 at the upper flat portion 48, a lower projection 51 and a lowermost projection 52 at the lower flat portion 50. A leaf spring 53 is provided to cover the slide valve 47, and retained in a valve casing 54 having a rectangular cross section together with the slide valve 47. The leaf spring 53 always presses the slide valve 47 in such a manner that the projections 49, 51 and 52 of the slide valve 47 slide in contact with a corresponding surface 55 within the valve casing 54.

In this ventilation line opening/closing means, the slide valve 47 and the valve casing 54 are both made of synthetic resin. A necessary airtightness is surely obtained by sliding both the members in contact with each other. Thus, there is generated between the slide valve 47 and the valve casing 54 a sliding resistance enough that the slide valve 47 can be kept stationary at a desired position. For the reasons, when a shutter 36 rotates, hooks 37 of the shutter 36 presses engagement pieces 56 to lift the slide valve 47 upwardly, and the slide valve 47 is kept stationary at the lifted position when engagement pieces 56 are released from being pressed by hooks 37. In contrast with this, when a filler cap 41 is tightly fitted into a filler port, a pressing portion 34 is pushed by the filler cap 41 so that the slide valve 47 is forced downwardly.

Figure 18:
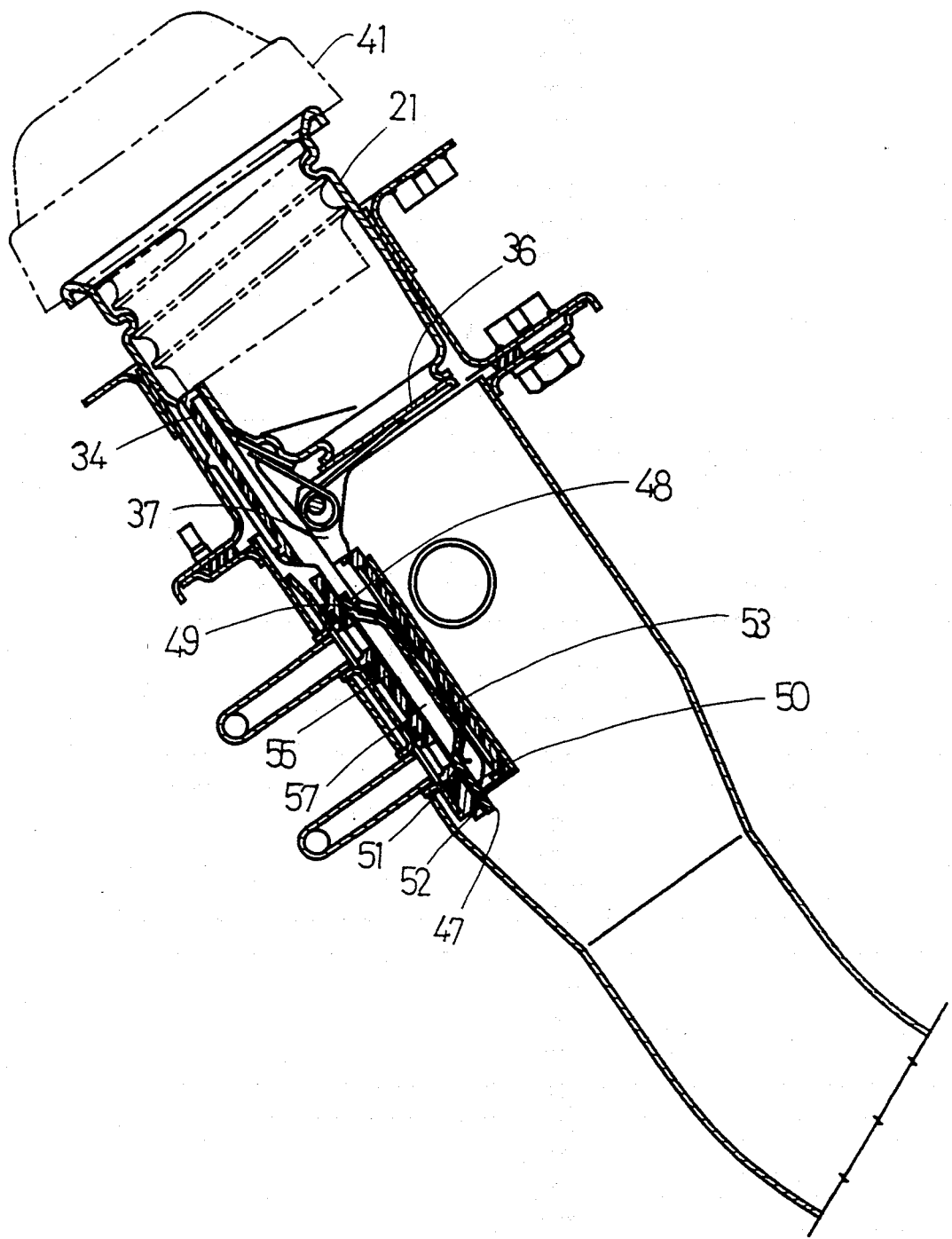
FIG. 18 is a cross-sectional view of the filler neck, showing an opening state of a ventilation line of a ventilation line opening/closing means having a slidable plate type opening/closing valve of which engagement pieces are pushed upwardly by the shutter.

At the time of running, as shown in FIG. 18, the slide valve 47 stands by under such a condition that the lower portion is protruded from the valve casing 54 whose lower end is opened. The ventilation line openings 26 and 27 are communicated with each other through a space 57 defined by the slide valve 47. In the case where the pressing portion 34 is arranged to contact with the lower end of the filler cap 41, there is no possibility that the slide valve 47 will erroneously move upwardly or it will be pushed downwardly, because an intermediate portion 30 is engaged with the upper end of the valve casing 54.

Figure 19:
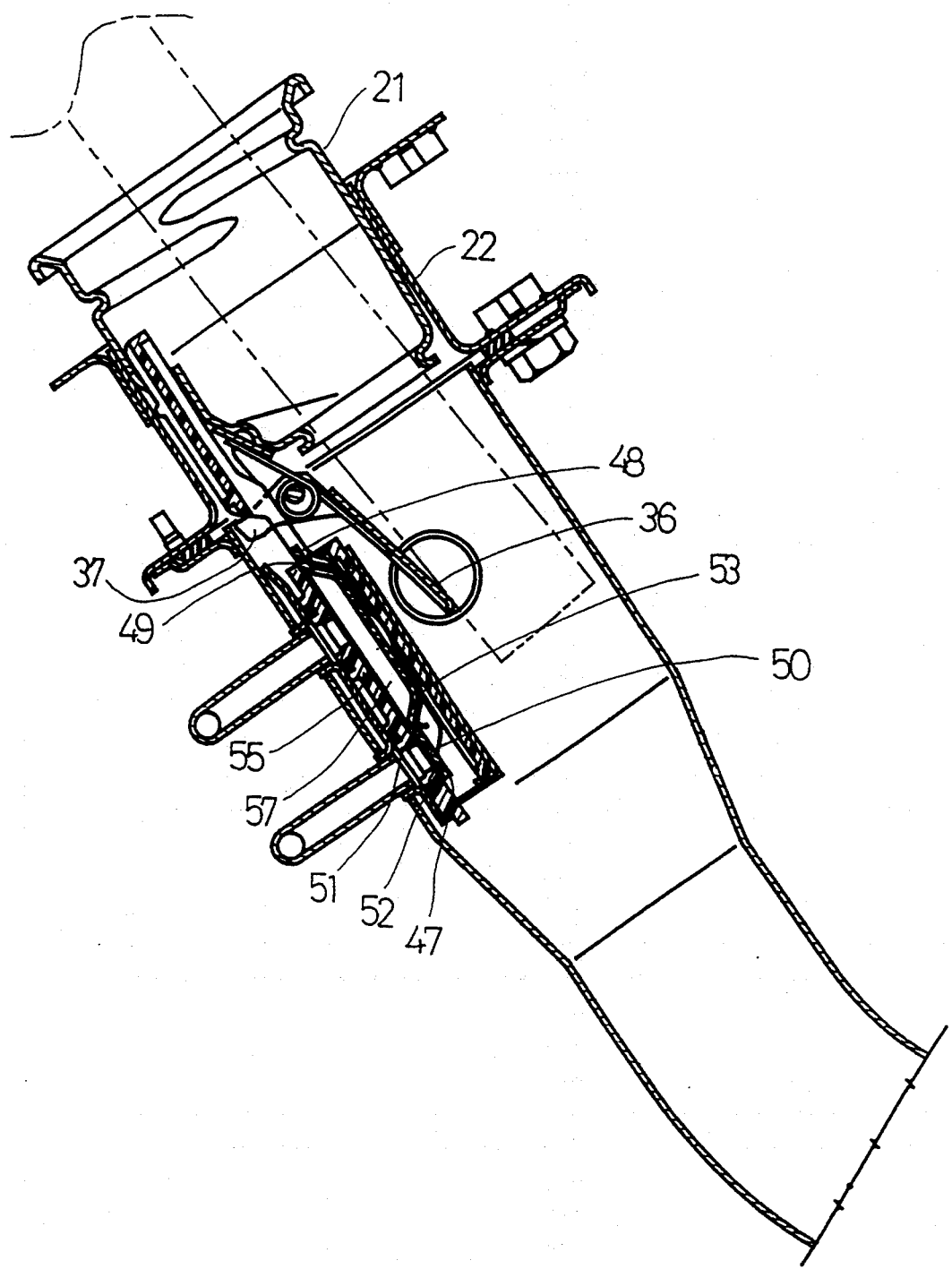
FIG. 19 is a cross-sectional view of the filler neck, showing a state of the ventilation line of the means in FIG. 18 when it is closed.
Figure 20:
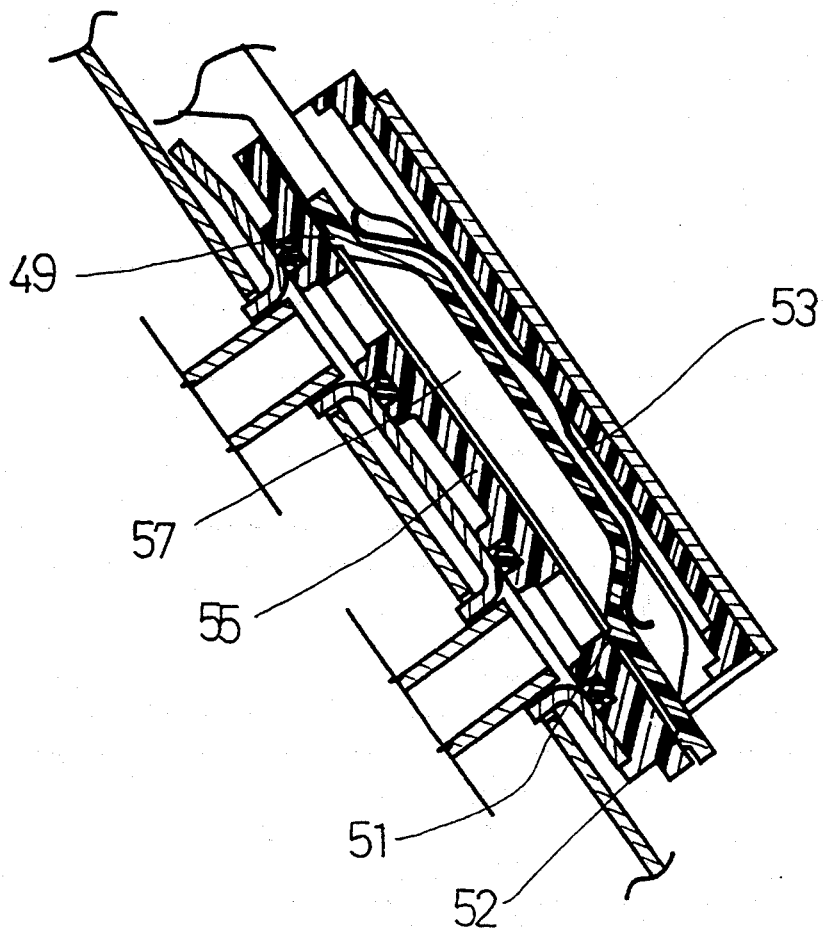
FIG. 20 is an enlarged cross-sectional view of essential parts, showing the engagement pieces and its surroundings on an enlarged scale.
Figure 21:
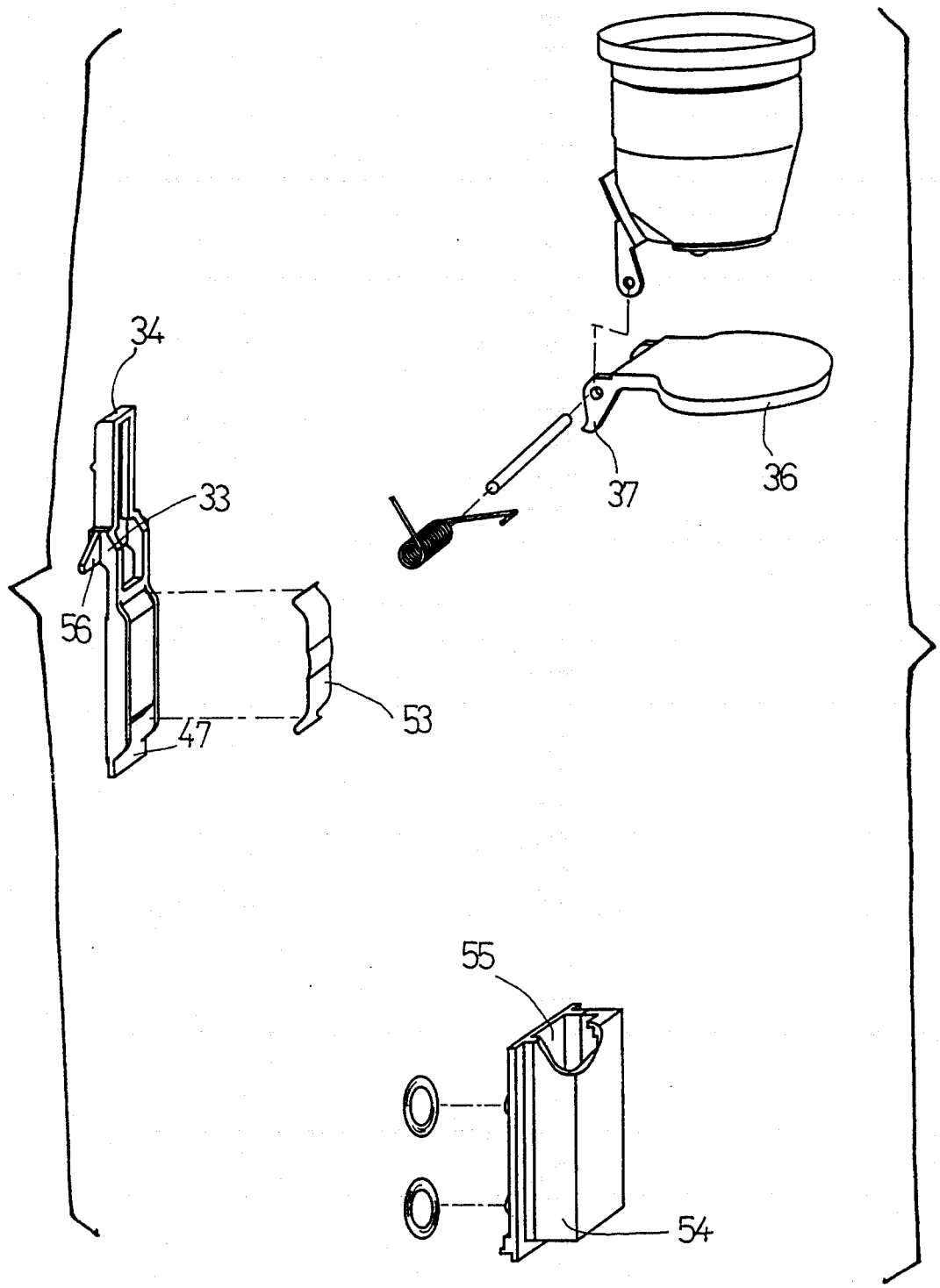
FIG. 21 is an exploded perspective view of principal parts constituting the means of FIG. 18.

At the time of fuel supply, as shown in FIG. 19, when the filler cap 41 is disconnected from a cap retainer 21 and a fuel supplying nozzle 42 is inserted into a filler neck 22 (the two-dot chain line in FIG. 19), the shutter 36 is pushed downwardly for rotation by means of the fuel supplying nozzle 42. Simultaneously, the hooks 37 press the engagement pieces 56 to move the slide valve 47 upwardly. The lower projection 51 passes over the lower ventilation line opening 26 to move upwardly, so that the ventilation line opening 26 is closed by the lower projection 51 and the lowermost projection 52, thereby interrupting the ventilation line.

When the fuel supply is completed and the filler cap 41 is tightly fitted in the cap retainer, the slide valve 47 is pressed downwardly by the filler cap 41 to return to its initial position as illustrated in FIG. 18. In other words, the lower projection 51 of the slide valve 47 moves downwardly over the lower ventilation line opening 26 again, so as to open the ventilation line. When the filler cap 41 is tightly fitted in the filler port completely, because the slide valve 47 is not applied with any external force, the slide valve 47 is held stationary at the position where the pressing portion 34 is pressed by the filler cap 41. The slide valve 47 includes the space 57 having the substantially trapezoidal cross section of which length is generally equal to the interval between the ventilation line openings. The lower end of the valve casing 54 is opened, and the upper end of the valve casing is opened and extended upwardly from the upper projection by a distance of movement of the slide valve.

As compared with the ventilation line opening/closing means having the above-described cylindrical slide valves, this type of ventilation line opening/closing means using the plate-like slide valve has various advantages such that: (1) the members for sealing the ventilation line are not deteriorated by fuel so that operation security can be obtained because they are not made of rubber; and (2) the structure is simple and the production cost can be reduced, and even if the processing accuracy in manufacturing the valve parts is sacrificed, a necessary airtightness can be obtained by using the leaf spring. This ventilation line opening/closing means can thus be remarkably useful.

As mentioned above, the ventilation line opening/closing means according to the invention is advantageous in that the structure thereof is simplified by using the slide valve, the opening/closing means can be made compact, and further there is no possibility that the ventilation line opening/closing means will not disturb the fuel supplying work.

What is claimed is:

1. A ventilation line opening/closing means of a fuel tank, characterized in that an opening/closing valve provided in a ventilation line for vapor leading from the fuel tank to a canister includes a closure means for closing the valve by opening a shutter when a fuel supplying nozzle is inserted into a filler port and said valve remains closed even when said fuel supplying nozzle is removed from said filler port and an opening means for opening the valve only when a filler cap is tightly fitted in the filler port.

2. A ventilation line opening/closing means of a fuel tank according to claim 1, wherein a slide valve including a pressing portion at an upper end of said slide valve and at least one engagement pin at an intermediate portion of said slide valve is arranged to slide within a valve casing in which ventilation line openings from the fuel tank and the canister which are disposed on an inner side surface of the valve casing are communicated with each other, thus constituting the opening/closing valve, and said opening/closing valve is adapted to be operated by: a closure means for the opening/closing valve which forces the slide valve upwardly so as to interrupt the ventilation line when the at least one engagement pin is pushed by means of at least one hook provided on a shutter rotated downwardly by being pushed with the inserted fuel supplying nozzle and an opening means for the opening/closing valve which moves the slide valve downwardly again so as to open the ventilation line when the tightly fitted filler cap pushes the pressing portion of the slide valve.

3. A ventilation line opening/closing means of a fuel tank according to claim 1, wherein a slide valve including a pressing portion at at least one upper end of said slide valve and an engagement pin at an intermediate portion of said slide valve is arranged to slide within a valve casing in which ventilation line openings from the fuel tank and the canister which are disposed on an inner side surface of the valve casing are communicated with each other, thus constituting the opening/closing valve, and said opening/closing valve is adapted to be operated by: a closure means for the opening/closing valve which forces the slide valve upwardly so as to interrupt the ventilation line when the at least one engagement pin is pushed by a shutter rotated downwardly by being pushed with the inserted fuel supplying nozzle by means of a coil spring attached thereto; and an opening means for the opening/closing valve which moves the slide valve downwardly again so as to open the ventilation line when the tightly fitted filler cap pushed the pressing portion of the slide valve.

4. A ventilation line opening/closing means of a fuel tank according to claim 2 or 3, wherein said valve casing and said slide valve are both made of synthetic resin, and an appropriate sliding resistance exists between the valve casing and the slide valve so that the slide valve can be held stationary at a desired position.

5. A ventilation line opening/closing means of a fuel tank according to claim 1, wherein a slide valve includes a pressing portion at an upper end, engagement pins at an intermediate portion and an upwardly-expansible spring attached to the lower end, said slide valve being adapted to slide within a valve casing having elastic arms for engaging with said engagement pins, which valve casing communicates with ventilation line openings from the fuel tank and the canister provided on an inner side wall of the valve casing, thus constituting the opening/closing valve for the ventilation line, and said opening/closing valve is adapted to be operated by: a closure means for the opening/closing valve which forces the slide valve upwardly by means of the spring so as to interrupt the ventilation line when hooks provided on the a shutter downwardly rotated by the inserted fuel supplying nozzle bias the elastic arms to release the engagement pins; and an opening means for the opening/closing valve which moves the slide valve downwardly again so as to open the ventilation line when the tightly fitted filler cap pushes the pressing portion of the slide valve.

* * * * *